United States Patent
McGrew et al.

(10) Patent No.: US 10,836,509 B2
(45) Date of Patent: Nov. 17, 2020

(54) AERIAL LAUNCH AND/OR RECOVERY FOR UNMANNED AIRCRAFT, AND ASSOCIATED SYSTEMS AND METHODS

(71) Applicant: Insitu, Inc., Bingen, WA (US)

(72) Inventors: James Statelar McGrew, Husum, WA (US); Matthew David Grubb, White Salmon, WA (US); Andrew Keith Dickson, Bingen, WA (US); Andrew Royds Hayes, Hood River, WA (US)

(73) Assignee: INSITU, INC., Bingen, WA (US)

( * ) Notice: Subject to any disclaimer, the term of this patent is extended or adjusted under 35 U.S.C. 154(b) by 401 days.

(21) Appl. No.: 15/839,592

(22) Filed: Dec. 12, 2017

(65) Prior Publication Data

US 2018/0162528 A1 Jun. 14, 2018

Related U.S. Application Data

(60) Provisional application No. 62/433,697, filed on Dec. 13, 2016.

(51) Int. Cl.
*B64F 1/02* (2006.01)
*B64C 39/02* (2006.01)
(Continued)

(52) U.S. Cl.
CPC .............. *B64F 1/029* (2020.01); *B64C 25/68* (2013.01); *B64C 27/08* (2013.01); *B64C 37/02* (2013.01); *B64C 39/024* (2013.01); *B64D 5/00* (2013.01); *B64F 1/02* (2013.01); *B64C 2201/027* (2013.01); *B64C 2201/042* (2013.01);
(Continued)

(58) Field of Classification Search
CPC ................ B64C 37/02; B64C 2201/18; B64C 2201/182; B64C 2201/201; B64D 5/00; B64F 1/02; B64F 1/029; B64F 1/0295
See application file for complete search history.

(56) References Cited

U.S. PATENT DOCUMENTS

| 8,038,090 B2 | 10/2011 | Wilson |
| 2002/0100838 A1 | 8/2002 | McGeer et al. |

(Continued)

FOREIGN PATENT DOCUMENTS

WO WO-2014080386 5/2014

OTHER PUBLICATIONS

International Search Report and Written Opinion for International Patent Application No. PCT/US2017/065890, Applicant: Insitu, Inc., dated Apr. 23, 2018, 12 pages.

(Continued)

*Primary Examiner* — Nicholas McFall
(74) *Attorney, Agent, or Firm* — Hanley, Flight & Zimmerman, LLC

(57) ABSTRACT

Aerial launch and/or recovery for unmanned aircraft, and associated systems and methods. A representative system includes a first, carrier aircraft having an airframe a propulsion system carried by the airframe and positioned to support the carrier aircraft in hover, and a capture line carried by the carrier aircraft and deployable to hang from the carrier aircraft. The capture line is sized to releasably engage with a capture device of a second, carried aircraft. The system further includes a retrieval device positioned to support the carried aircraft for detachment from the capture line.

33 Claims, 26 Drawing Sheets

(51) Int. Cl.
*B64D 5/00* (2006.01)
*B64C 37/02* (2006.01)
*B64C 25/68* (2006.01)
*B64C 27/08* (2006.01)

(52) U.S. Cl.
CPC .. *B64C 2201/082* (2013.01); *B64C 2201/108* (2013.01); *B64C 2201/182* (2013.01); *B64C 2201/201* (2013.01)

(56) References Cited

U.S. PATENT DOCUMENTS

| | | | |
|---|---|---|---|
| 2009/0294584 A1* | 12/2009 | Lovell | B63B 27/10 244/110 F |
| 2015/0166177 A1 | 6/2015 | Bernhardt | |
| 2016/0114906 A1* | 4/2016 | McGeer | B64C 39/024 244/63 |
| 2016/0152339 A1* | 6/2016 | von Flotow | B64D 1/12 244/2 |
| 2016/0327945 A1 | 11/2016 | Davidson | |
| 2017/0297738 A1* | 10/2017 | von Flotow | B64D 1/02 |

OTHER PUBLICATIONS

European Patent Office, "Extended European Search Report," issued in connection with European Patent Application No. 17881921.5, dated Jul. 30, 2020, 9 pages.

\* cited by examiner

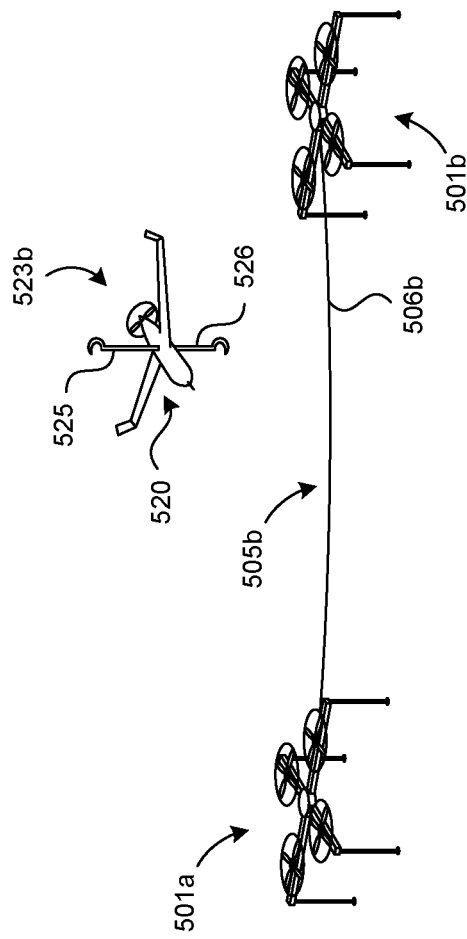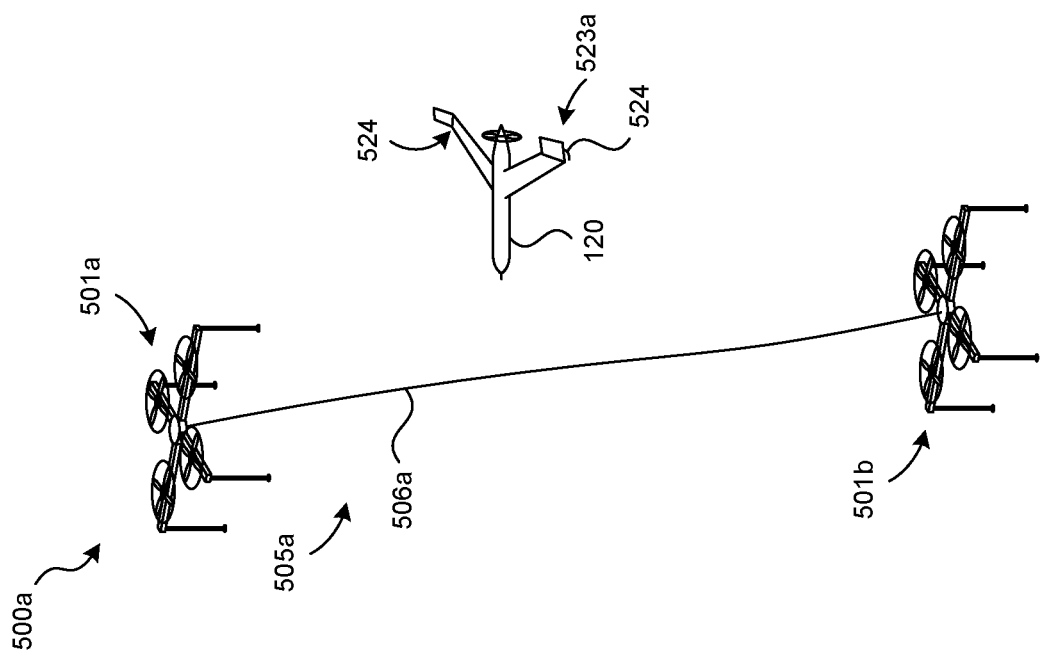

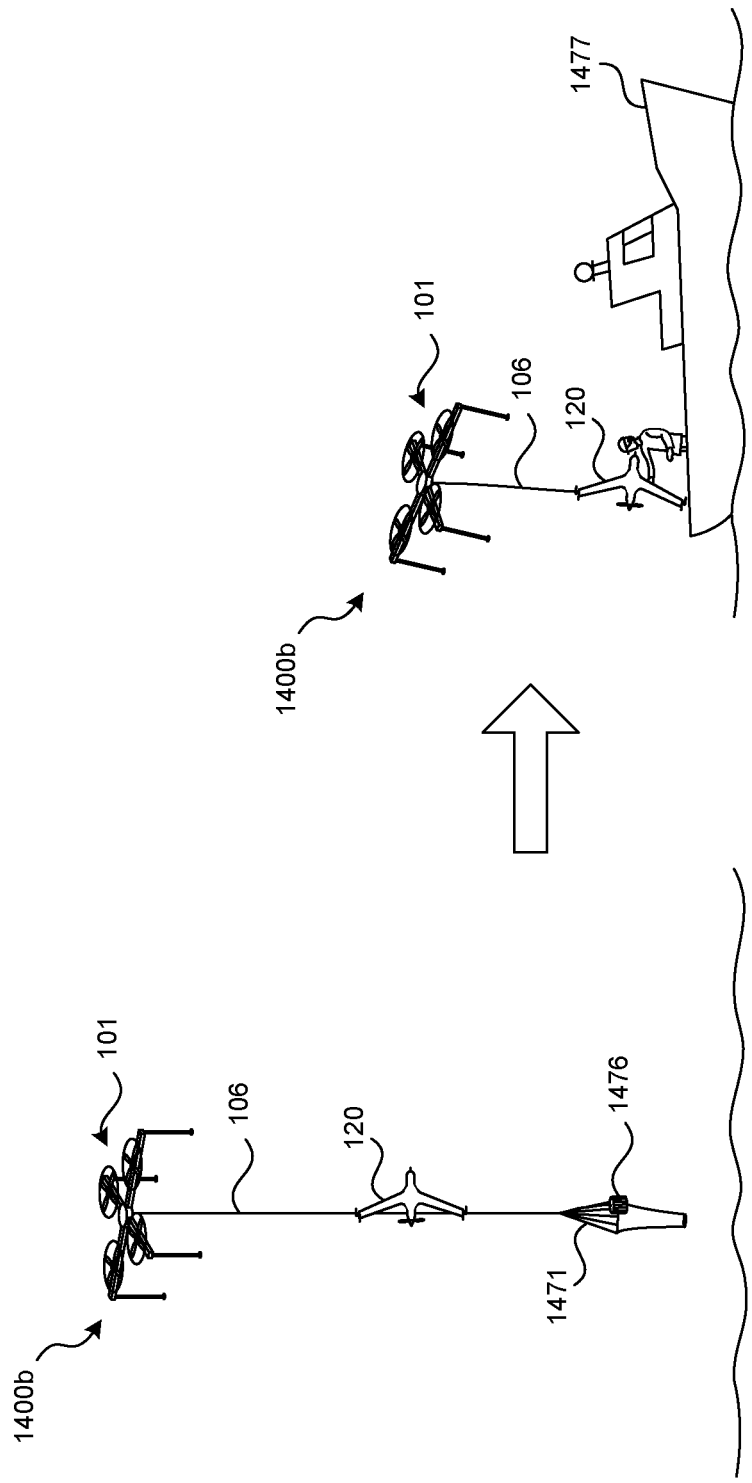

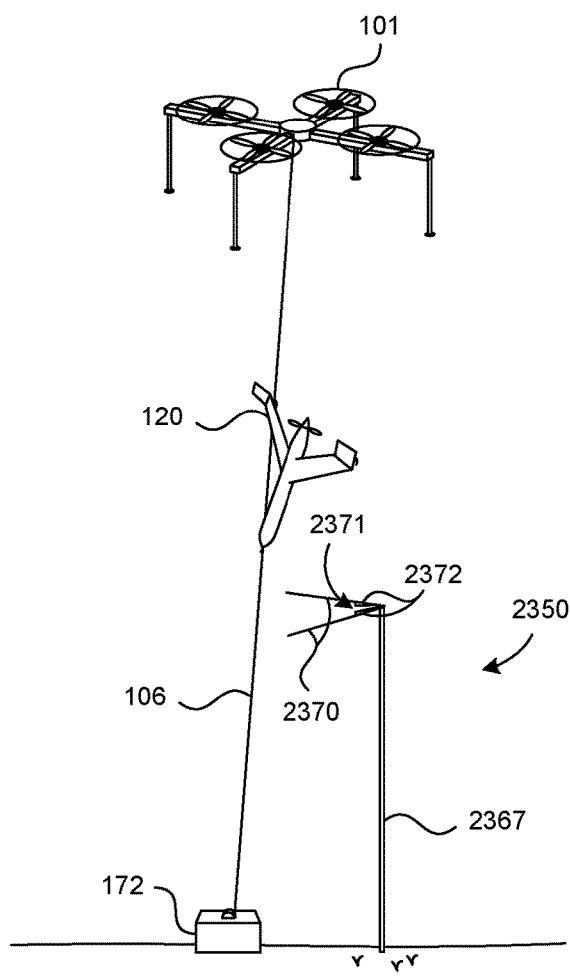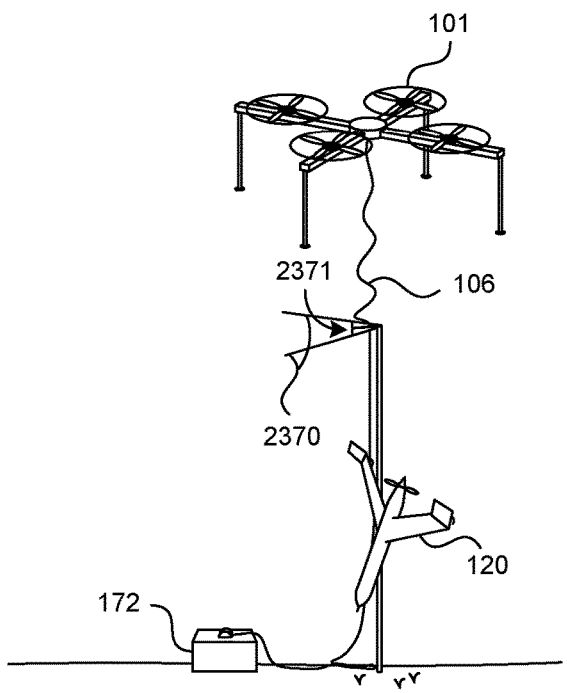
*FIG. 23A*          *FIG. 23B*

AERIAL LAUNCH AND/OR RECOVERY FOR UNMANNED AIRCRAFT, AND ASSOCIATED SYSTEMS AND METHODS

CROSS-REFERENCE TO RELATED APPLICATIONS

The present application claims priority to U.S. Provisional Application No. 62/433,697, filed on Dec. 13, 2016. The foregoing application is incorporated herein by reference.

TECHNICAL FIELD

The present technology is directed generally to aerial launch and/or recovery for unmanned aircraft, and associated systems and methods.

BACKGROUND

Aircraft require varying degrees of support equipment and systems for launch and recovery. Conventionally, aircraft take off from and land on runways, usually located at airports that provide parking, fuel, hangars, air and ground traffic control, maintenance services, and terminals for passengers, baggage, and freight. Unmanned aircraft, including drones, unmanned aerial vehicles (UAVs), unmanned aircraft systems (UAS) and robotic aircraft, present unique challenges and opportunities for mechanisms and methods that enable the safe initiation of flight (takeoff or launch) and safe capture, recovery, and return of the aircraft. For example, some existing unmanned aircraft are launched using catapults, and captured using wing-mounted hooks that engage with a suspended capture line.

While the foregoing techniques, particularly techniques including catapult launch and suspended-line capture, have proven successful, there remains a need for systems with improved size, weight, and cost characteristics.

BRIEF DESCRIPTION OF THE DRAWINGS

Unless otherwise noted, the Figures may not be drawn to scale, for purposes of illustration and/or clarity.

FIG. 5A is a partially schematic illustration of multiple first aircraft operating to position a capture line in a generally vertical orientation for capturing a second aircraft, in accordance with some embodiments of the present technology.

FIG. 5B is a partially schematic illustration of multiple first aircraft operating to position a capture line in a generally horizontal orientation for capturing a second aircraft, in accordance with some embodiments of the present technology.

FIGS. 14B-14D are a partially schematic illustrations of a first aircraft configured to operate in a marine environment, in accordance with some embodiments of the present technology.

FIGS. 23A-23D illustrate a system having a retrieval device that includes a mast with rope clamps configured to engage a capture line in accordance with some embodiments of the present technology.

DETAILED DESCRIPTION

The present disclosure describes systems and methods for launching and/or recovering aircraft, in particular, unmanned aircraft. Many specific details of some embodiments of the disclosure are set forth in the following description and FIGS. 1-27D to provide a thorough understanding of these embodiments. Well-known structures, systems, and methods that are often associated with such embodiments, but that may unnecessarily obscure some significant aspects of the disclosure, are not set forth in the following description for purposes of clarity. Moreover, although the following disclosure sets forth some embodiments of the technology, some embodiments of the technology can have different configurations and/or different components than those described in this section. As such, the technology may include embodiments with additional elements, and/or without several of the elements described below with reference to FIGS. 1-27D.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

Figure 1:
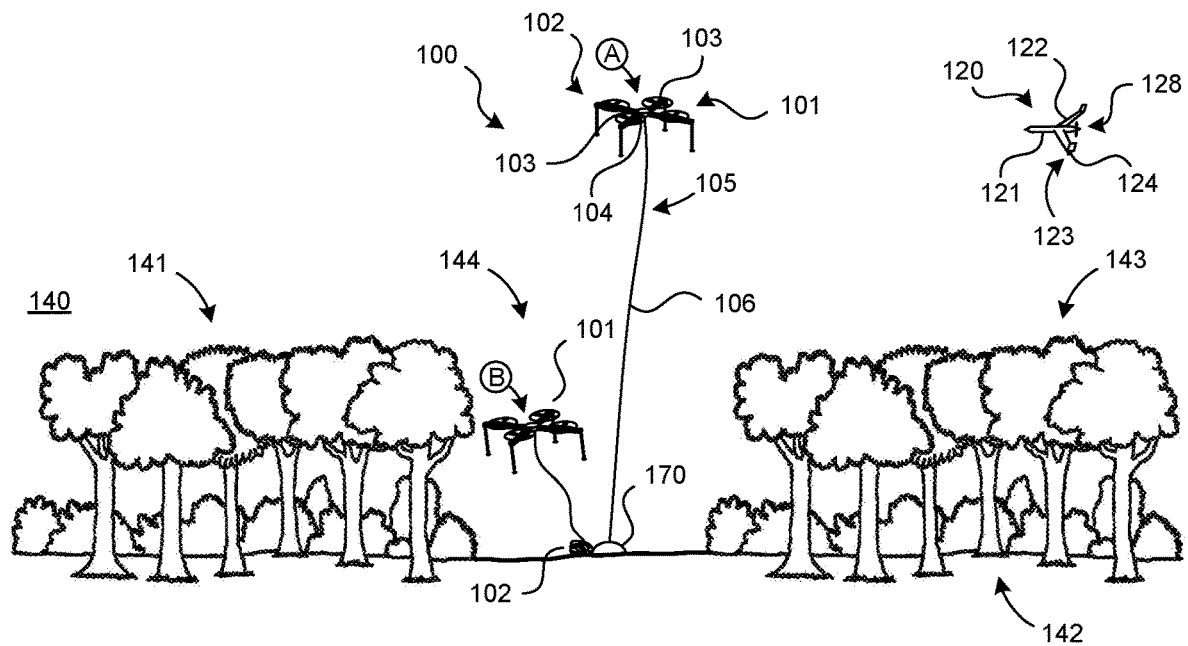
FIG. 1 is partially schematic illustration of a system that includes a first aircraft configured to capture a second aircraft, in accordance with some embodiments of the present technology.

FIG. 1 is a partially schematic illustration of a system 100 that includes a first aircraft 101 and a second aircraft 120. The first aircraft 101 can be configured to launch, capture, or both launch and capture the second aircraft 120. Accordingly, the first aircraft 101 may be referred to herein as a carrier, capture, or support aircraft, and the second aircraft 120 may be referred to herein as a carried, captured, or target aircraft. The carrier aircraft can conduct a carrying function before launch and/or after capture, and the carried aircraft can be carried before launch and/or after capture. In some embodiments, the system 100 can be configured to operate in an environment 140 having obstructions 141 that make conventional techniques for launching and/or capturing the second aircraft 120 difficult. Further details of representative first aircraft 101, second aircraft 120, and the environments in which they operate are described below.

With continued reference to FIG. 1, the first aircraft 101 can be configured for vertical takeoff and landing (VTOL), and hover, to allow for operation in constrained areas. Accordingly, the first aircraft 101 can include an airframe 102 and multiple rotors 103 (e.g., in a quad-rotor configuration) powered by an on-board power source 104. The first aircraft 101 can include a first capture device 105, for example, a flexible capture line 106 that hangs down from the first aircraft 101 in a position suitable for engaging with the second aircraft 120 during a capture operation.

Figure 2:
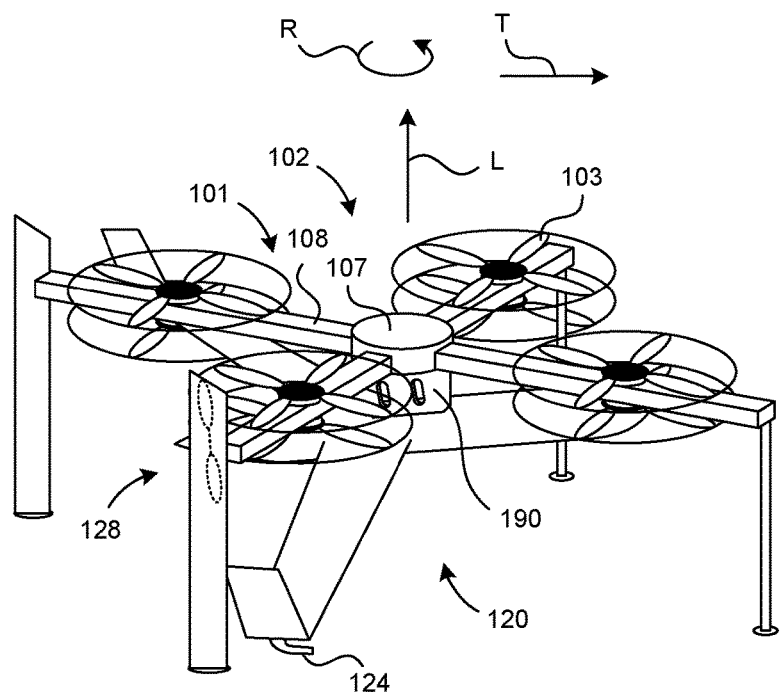
FIG. 2 is a partially schematic illustration of a representative first aircraft carrying a representative second aircraft.

In a some embodiments, the second aircraft 120 can have a fixed-wing configuration, with a fuselage 121 carried by fixed wings 122. The second aircraft 120 is propelled by a propulsion system 128, e.g., an on-board propulsion system. The propulsion system 128 can include one or more pusher propellers (one is shown in FIG. 2) or tractor propellers, powered by an internal combustion engine, electric motor, battery, and/or other suitable device. The second aircraft 120 can include a second capture device 123 positioned to engage with the first capture device 105 carried by the first aircraft 101. In some embodiments, the second capture device 123 includes one or more wing tip hooks or capture devices 124. When one of the wings 122 strikes the capture line 106, the corresponding wing tip hook or hooks 124 releasably engage with the capture line 106, causing the captured second aircraft 120 to dangle from the capture line 106. The first aircraft 101 then guides the capture line 106 and the captured second aircraft 120 in a controlled descent to the ground. Further details of representative capture devices and techniques are described in U.S. Pat. Nos. 6,264,140 and 7,059,564, both assigned to the assignee of the present application, and both incorporated herein by reference.

In some embodiments, e.g., as shown in FIG. 1, the system 100 includes a downline apparatus 170 to which the capture line 106 is attached. The downline apparatus 170 can include an anchor and/or shock absorbing elements that cushion the impact of the second aircraft 120 with the capture line 106.

In operation, the first aircraft 101 flies upwardly (e.g., vertically upwardly) to a position above the local obstructions 141 and a height sufficient to facilitate capturing the second aircraft 120. As shown in FIG. 1, the obstructions 141 can include trees 142 (e.g., in a forest or jungle), and the first aircraft 101 can ascend through a relatively small opening or clearing 144 in the trees 142. The power source 104, which provides power to the rotors 103 of the first aircraft 101, can include an internal combustion engine, a battery, and/or another suitable device that is carried aloft with the first aircraft 101. In some embodiments described later, the first aircraft 101 can receive power from a ground-based source. In any of these embodiments, the first aircraft 101 rises to a position indicated by letter A to capture the second aircraft 120, and then descends, as indicated by letter B once the second aircraft 120 has been captured. Near the ground, the first aircraft can lower the second aircraft 120 to the ground, autonomously, or under control of a pilot, with or without the assistance of a human operator on the ground to manually handle the aircraft as it descends the last few feet.

A representative power source 104 for the first aircraft 101 includes a rechargeable battery. An advantage of the rechargeable battery, when compared to other power sources such as an internal combustion engine, is that the battery can eliminate the need for an on-board fuel source (e.g., gasoline, aviation fuel, and/or another fuel) while still providing sufficient short-term power for a launch operation and/or a recovery operation.

In some embodiments, the first aircraft 101 can be configured not only to capture the second aircraft 120, but also to launch the second aircraft 120 from an aerial position. FIG. 2 schematically illustrates the general features of such an arrangement. As shown in FIG. 2, the first aircraft 101 can include a central portion 107 (e.g., a fuselage), and multiple arms 108. The propulsion system 128 can include multiple rotors 103 carried by the corresponding arms 108. The first aircraft 101 can also include a launch fixture 190 positioned to securely hold the second aircraft 120 during an ascent maneuver. The launch fixture 190 is configured to release the second aircraft 120 once aloft (e.g., upon command), and permit the first aircraft 101 to land without the second aircraft 120 attached. In some embodiments, the second aircraft 120 can include a fixed wing, pusher prop configuration, such as the ScanEagle® UAV, manufactured by Insitu, a subsidiary of The Boeing Company, and in some embodiments, can include any of a wide variety of other suitable vehicles having similar or different configurations.

In operation, the first aircraft 101 lifts the second aircraft 120 as indicated by arrow L, rotates to a suitable orientation as indicated by arrow R and translates to a suitable launch location as indicated by arrow T. Optionally, the first aircraft 101 can rotate again at the launch location, e.g., to position the second aircraft 120 facing into the wind for launch. The propulsion system 128 of the second aircraft 120 can be started either before the second aircraft 120 has been lifted, or after the second aircraft 120 is aloft. Once at the launch location, the first aircraft 101 releases the second aircraft 120 for flight, as will be described in further detail later with reference to FIGS. 11-12. In some embodiments, the second aircraft 120 is released at a high enough elevation (and has a suitably high glide slope) that it drops, gains air speed, and then levels off. In some embodiments, the first aircraft 101 has sufficient forward velocity at launch to reduce or eliminate any drop in elevation by the second aircraft 120 as the second aircraft 120 is released.

Figure 3:
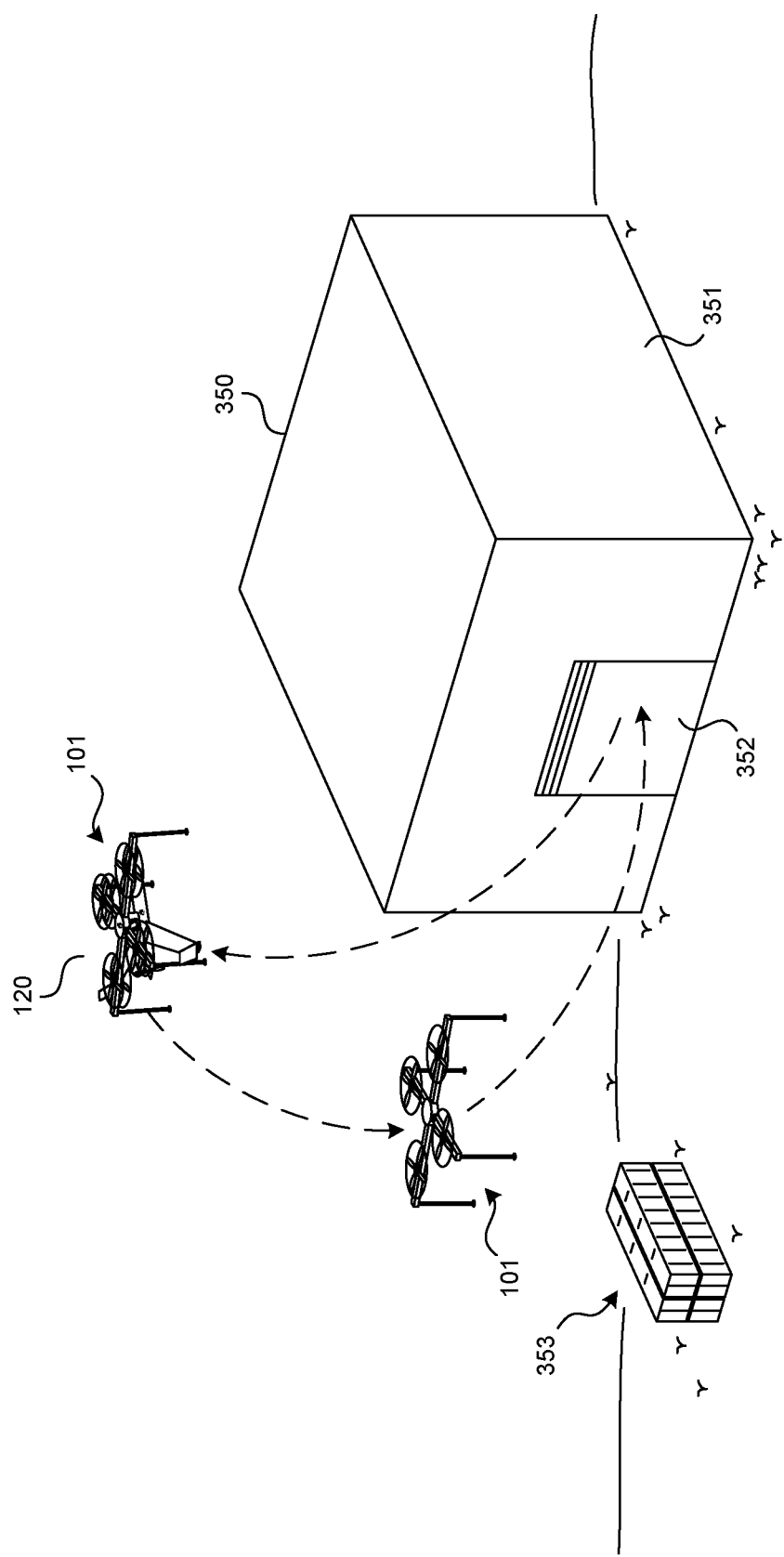
FIG. 3 is a partially schematic illustration of a process for deploying a first aircraft, launching a second aircraft carried by the first aircraft, and landing the first aircraft, in accordance with some embodiments of the present technology.

FIG. 3 is a partially schematic illustration of a representative first aircraft 101 operating from an enclosed space 350. The enclosed space 350 can include a building 351 having a restricted opening 352 through which the first aircraft 101 exits in preparation for a launch operation, and returns after the launch operation is complete. After returning, the same or a different first aircraft 101 can be prepared for a capture operation, e.g., by charging (or re-charging) on-board batteries or other power sources, and connecting to a capture line. The first aircraft 101 can then re-deploy from the enclosed space 350 to conduct a capture operation and again return to the enclosed space 350. The enclosed space 350 can enhance the "stealth" characteristics of the overall operation by obscuring the ability of others to observe the launch and recovery operations. In some embodiments, the enclosed space 350 can provide a sheltered area for operations, maintenance, refueling, recharging, inspections, reconfigurations, and/or other suitable elements of flight operations. The enclosed space 350 can include a temporary structure, a permanent structure, a natural protected volume with a restricted opening (e.g., a cave or overhang), and/or a natural space beneath a forest or jungle canopy (which can optionally be cleared and shaped for suitable operation). The enclosed space 350 can include soft and/or hard materials, for example, cloth, metal, concrete, wood, suitable fasteners and adhesives, and/or other suitable materials.

The first aircraft 101, second aircraft 120, and associated hardware and systems can be housed in one or more shipping containers 353 for transport to and from operational locations. The shipping containers 353 can also be housed in the enclosed space 350. To date, forward operations are provisioned at arbitrary times in the typical timeline of a forward operation, without the option to selectively pick and procure arbitrary lists of individual parts required for successful, smooth conduct of operations. Such operations can include surveillance and sensing using daylight and infrared cameras attached to the second aircraft 120. The shipping containers 353 can include standard boxes, for example, molded containers designed for modular (e.g., foldable or easily disassemble) unmanned aircraft, that can be provisioned with arbitrary selected combinations of components. Accordingly, the component set for a given mission can be standardized, which improves the efficiency with which the mission is supported and carried out.

Figure 4A:
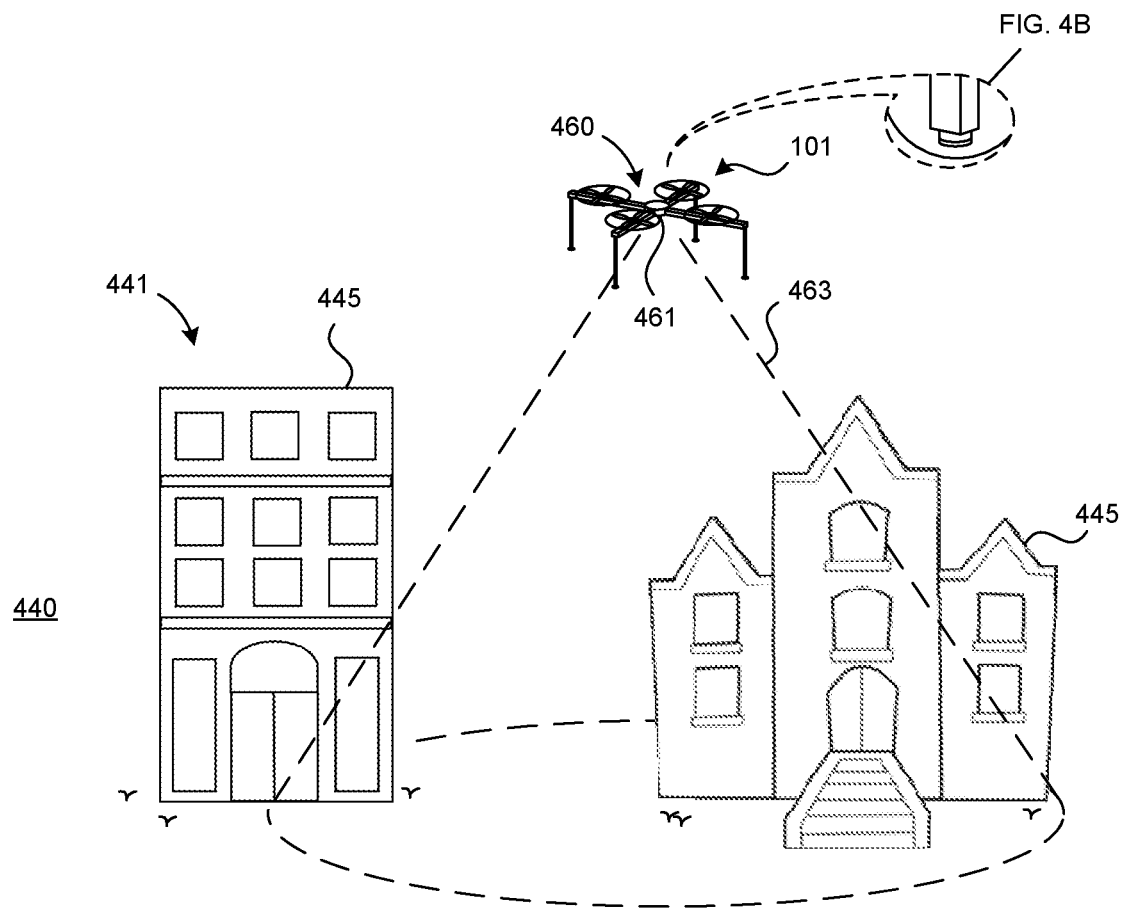
FIG. 4A is a partially schematic illustration of a first aircraft operating in an urban environment with obstructions that include buildings, in accordance with some embodiments of the present technology.
Figure 4B:
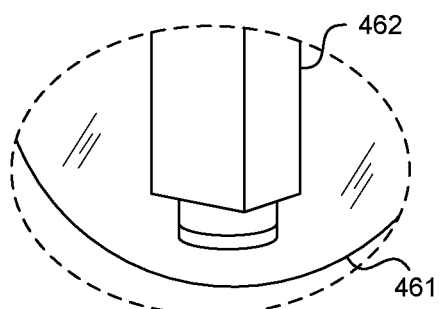
FIG. 4B is an enlarged illustration of a sensing pod and camera carried by the first aircraft shown in FIG. 4A.
Figure 6:
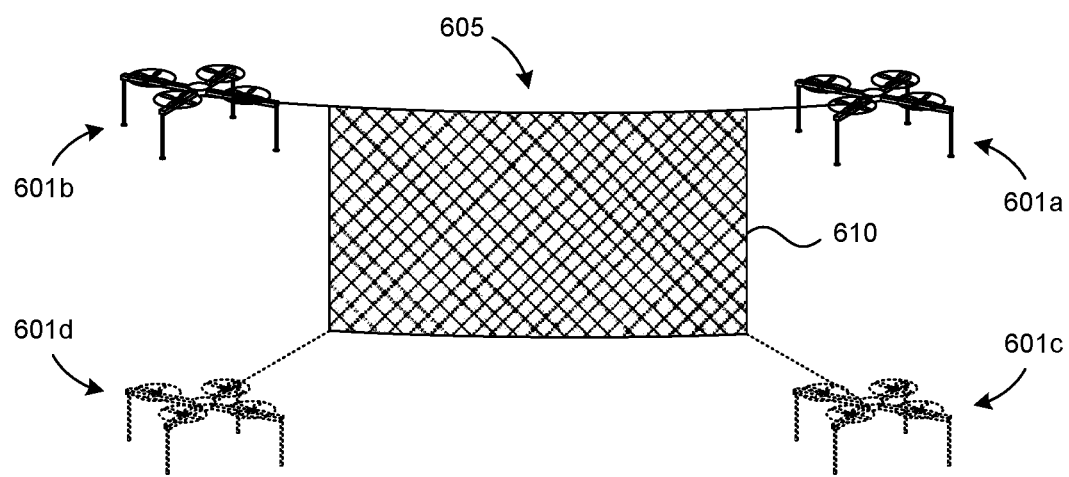
FIG. 6 is a partially schematic illustration of multiple first aircraft operating to support a net for capturing a second aircraft, in accordance with some embodiments of the present technology.

FIG. 4A is a partially schematic illustration of a representative first aircraft 101 operating in an urban environment 440 that includes obstructions 441 in the form of buildings 445 and/or other typically urban structures. The first aircraft 101 can operate in a manner generally similar to that described above with reference to FIGS. 1-3 and, in a some embodiments, can include one or more sensors 460 to aid in navigation during launch and/or capture operations. The sensor 460 can be housed in a sensing pod 461, a portion of which is shown in greater detail in FIG. 4B. As shown in FIG. 4B, the sensor 460 can include a camera 462, and the sensing pod 461 can be formed from a transparent material that protects the camera 462, while allowing the camera 462 suitable access to the environment 440. The camera 462 can operate at visible wavelengths, infrared wavelengths, and/or other suitable wavelengths, depending upon the particular mission carried out by the first aircraft 101. The sensing pod 461 can be carried by the first aircraft 101 in a position that allows for a significant field of view 463 (shown in FIG. 4A). The camera 462 can be used to perform any one or combination of functions associated with launching and capturing the second aircraft. For example, the camera 462 can be used to avoid obstacles as the first aircraft 101 ascends and descends during launch and/or recovery operations. During recovery operations, the camera 462 can also be used to gently lower the captured aircraft to the ground without damaging it.

As discussed above with reference to FIG. 1, the system 100 can include a downline apparatus 170 that secures the capture line 106 to the ground during capture operations. In at least some embodiments, it may not be feasible or practical to secure the capture line to the ground during capture operations. In such cases, the system can be configured to suspend the capture line between multiple first aircraft to provide suitable tension in the line, without relying on a ground-based anchor. For example, referring to FIG. 5A, a representative system 500a can include two first or support aircraft 501a, 501b carrying a first capture device 505a between them. In this embodiment, the first capture device 505a includes a generally vertical capture line 506a, e.g., a capture line that is more vertical than horizontal. The two first aircraft 501a, 501b can be positioned one above the other to align the capture line 506a in a generally vertical orientation. A second aircraft 120, e.g., having a configuration generally similar to that described above with reference to FIG. 1, can include a corresponding second capture device 523a that includes wing-tip hooks 524 positioned to engage the capture line 506a. The two first aircraft 501a, 501b can fly cooperatively to provide the proper tension in the capture line 506a, and to safely bring the second aircraft 120 to the ground after capture. In some embodiments, the coordinated operation of the two first aircraft 501a, 501b can be autonomous, or partially autonomous, with the first aircraft 501a, 501b communicating directly with each other to perform the capture and landing operation. In still a further aspect of some embodiments, a manual override instruction issued by the operator (e.g., seizing manual control) will be applied to both the first aircraft 501a, 501b.

FIG. 5B illustrates an arrangement similar to that shown in FIG. 5A, but with the two first or support aircraft 501a, 501b carrying a first capture device 505b that includes a capture line 506b positioned in a generally horizontal rather than vertical orientation (e.g., with the capture line 506b more horizontal than vertical). This orientation can be suitable for capturing a second aircraft having a different second capture device. For example, as shown in FIG. 5B, a representative second aircraft 520 can include a second capture device 523b that in turn includes an upper hook 525 and a lower hook 526. The hooks 525, 526 can be stowed during normal flight and then deployed prior to capture. In some embodiments, only one of the hooks 525, 526 is deployed, depending upon the position of the second aircraft 520 relative to the capture line 506b. In some embodiments, both hooks 525, 526 can be deployed to provide greater assurance of a successful capture, regardless of whether the second aircraft 520 passes above or below the capture line 506b during the capture operation.

In some embodiments, multiple first aircraft can carry and deploy capture devices having configurations other than a suspended capture line. For example, referring now to FIG. 6, two first aircraft 601a, 601b are configured to carry a capture device 605 between them, with the capture device 605 including a net 610. The net 610 can be used to capture aircraft that may not have the specific capture devices described above with reference to FIGS. 5A-5B (e.g., wing-tip hooks and/or upper and lower hooks). In one aspect of this embodiment, the net 610 may have weights at or near the lower edge to keep the net 610 properly oriented. In some embodiments, two additional first aircraft 601c, 601d (shown in dashed lines) are used to provide support and positioning for the lower corners of the net 610. In some embodiments, the second aircraft (not shown in FIG. 6) captured via the net 610 can be specifically configured for such capture operations. For example, the second aircraft can have fewer and/or particularly robust projections that withstand the forces that may be encountered as the second aircraft engages with the net 610. In some embodiments, the second aircraft and/or the techniques used to capture the second aircraft with the net 610 can be configured to avoid the need for such specific designs. For example, the first aircraft 601a, 601b carrying the net 610 can fly the net in the same direction as the incoming second aircraft to reduce the forces imparted to the second aircraft as it engages with the net 610.

One aspect of an embodiment of the system described above with reference to FIG. 1 is that the power source for the first aircraft (e.g., a battery-powered motor, or an internal combustion engine) is carried on-board the first aircraft. In some embodiments, power can be supplied to the first aircraft from a ground-based source. For example, referring now to FIG. 7, a representative first aircraft 701a can receive power from a ground-based power source 730, via a power transmission link 731. In a particular aspect of some embodiments, the power transmission link 731 can include a power cable 732a that transmits electrical power to a power receiver 713 carried by the first aircraft 701a. The power receiver 713 can include a connector 711, for example, a quick-release electrical connector, which is coupled to one or more on-board electrical motors to drive corresponding rotors 703 of the first aircraft 701a. The first aircraft 701a can carry a capture line 706 for capturing a suitably-equipped second aircraft 120a (FIG. 5A).

Figure 7:
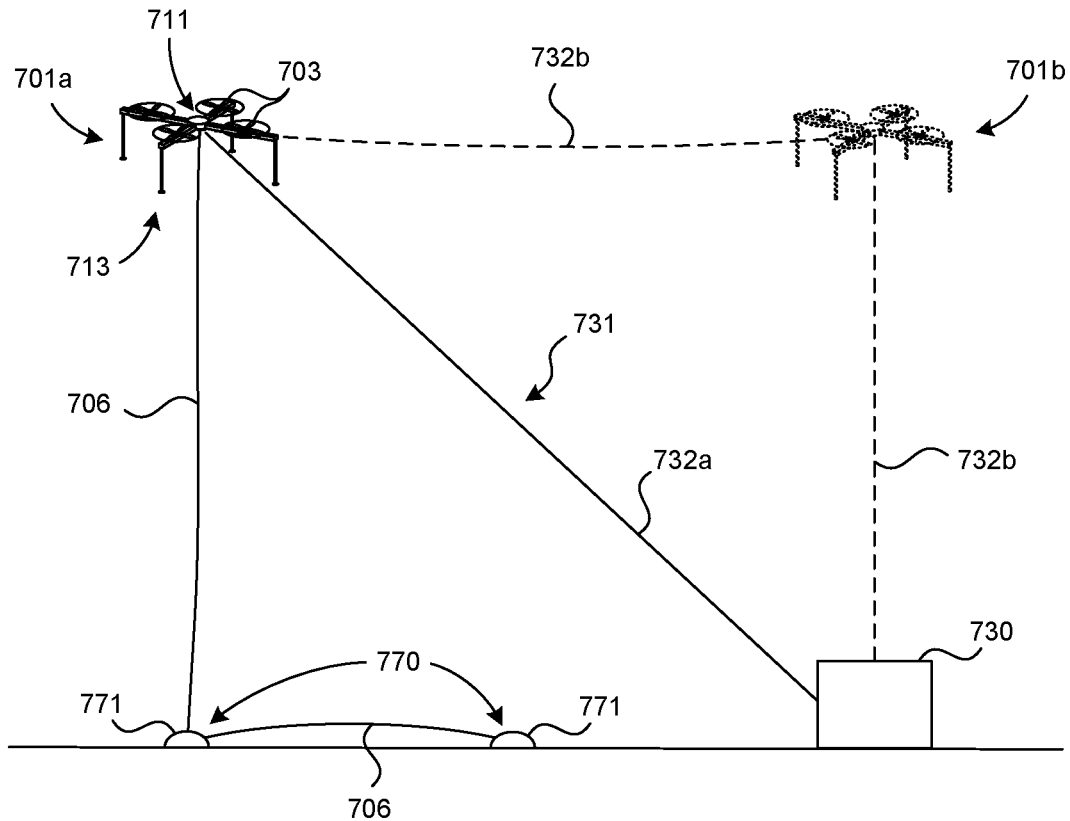
FIG. 7 is a partially schematic illustration of a first aircraft that receives power from a ground-based power source, alone or in combination with another aircraft, in accordance with embodiments of the present technology.
Figure 8:
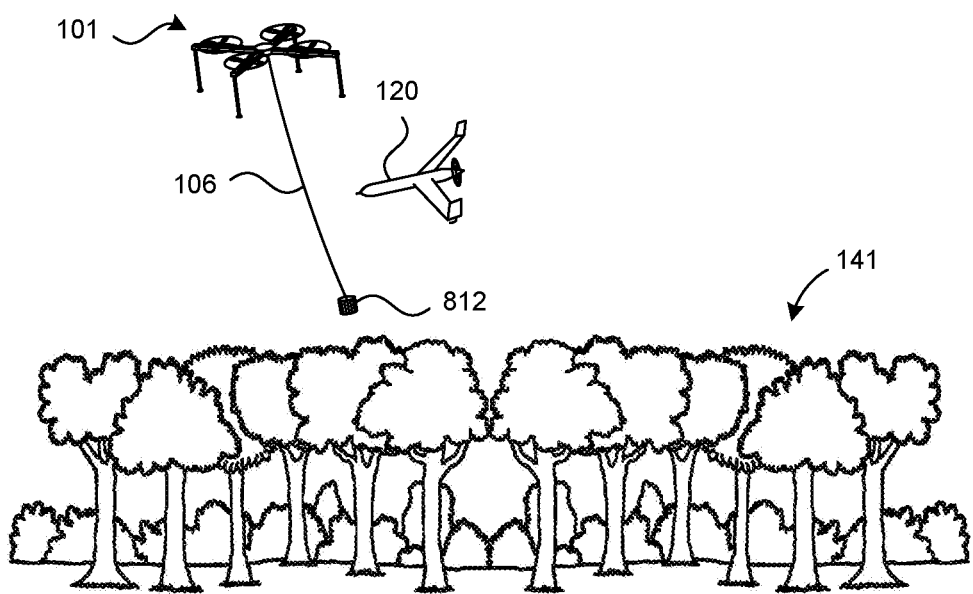
FIG. 8 is a partially schematic illustration of a first aircraft positioned above obstructions to capture a second aircraft, in accordance with embodiments of the present technology.

In another aspect of an embodiment shown in FIG. 7, the system can include multiple first aircraft shown as two first aircraft 701a, 701b, e.g., to position the power transmission link 731 in a way that reduces or eliminates interference with the capture line 706. For example, one first aircraft 701a (shown in solid lines) can carry the capture line 706 and the power receiver 713, and another first aircraft 701b (shown in dotted lines) can carry a corresponding power cable 732b (also shown in dotted lines) in a position that is offset away from the capture line 706. Accordingly, one of the first aircraft can perform the capture operation (and optionally a launch operation) and the other can provide a support function. The first aircraft 701b performing the support function can have the same configuration as the first aircraft 701a performing the capture function, or the two aircraft can have different configurations. For example, the first aircraft 701b performing the support function can have a greater or lesser load capacity, depending on whether the loads associated with the power-cable carrying function are greater or less than the loads associated with the capture function. The corresponding power cable 732b can include multiple segments, for example, one segment between the ground-based power source 730 and the first aircraft 701b, and another between the two first aircraft 701a, 701b.

Whether or not multiple first aircraft 701 are employed in the arrangement shown in FIG. 7, the capture line 706 can be attached to a downline apparatus 770 that includes one or more anchors 771. The anchor(s) 771 can perform different functions. For example, one anchor can redirect the path of the capture line 706 to another anchor, which includes shock absorbing features to cushion the impact of a second aircraft 120 (FIG. 5A) striking the capture line 706 during a capture operation.

As discussed above, the capture line 706 can be tensioned via a ground-based downline apparatus, or by another aircraft. In some embodiments, shown in FIG. 8, a representative first aircraft 101 can carry a capture line 106 that is tensioned by a hanging mass 812, e.g., attached to the capture line 106 at or near its free end. This arrangement can allow the first aircraft 101 to perform a capture operation while positioned completely above any nearby obstructions 141, without the need for access to the ground (or another first aircraft) to provide tension in the capture line 106.

Figure 9:
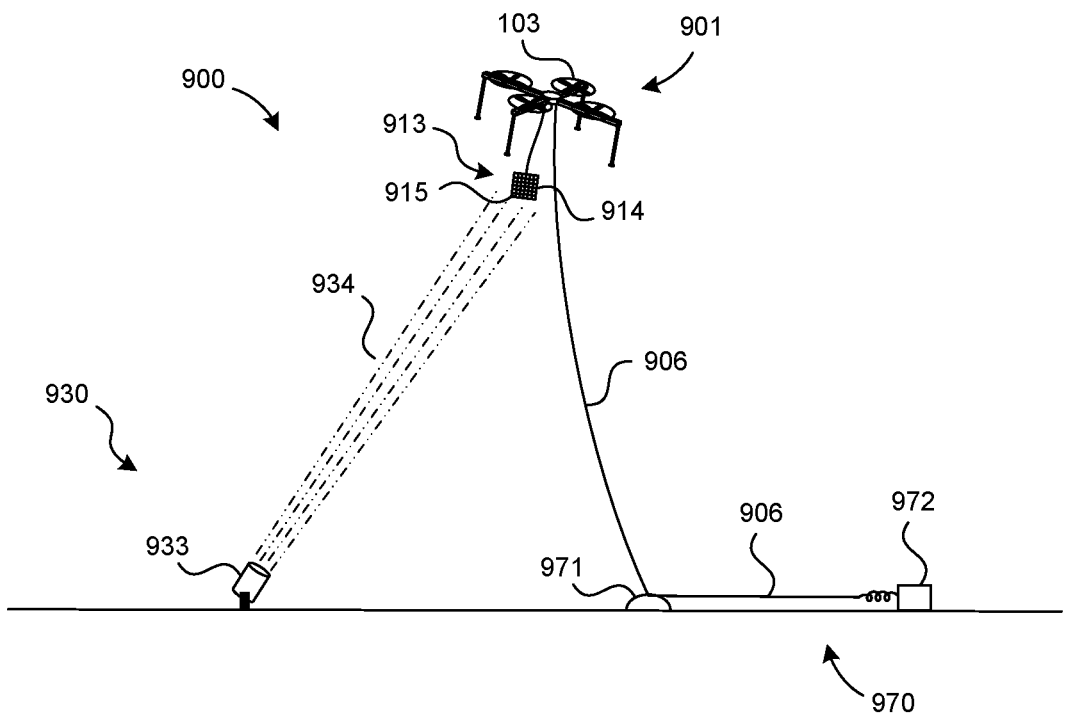
FIG. 9 is a partially schematic illustration of a first aircraft that receives power from a ground-based power source via a wireless link, in accordance with some embodiments of the present technology.

FIG. 9 is a partially schematic illustration of a system 900 that includes a first aircraft 901 configured to receive power from a ground-based source 930 via a wireless link. In a particular aspect of some embodiments, the ground-based power source 930 includes a radiation source 933, e.g., a source of illumination or other electromagnetic radiation 934. The first aircraft 901 can include a power receiver 913 that in turn includes one or more wireless receiver elements 914 positioned to receive energy from the ground-based power source 930. For example, the power receiver 913 can include one or more photovoltaic cells 915 that receive the radiation 934, convert the radiation to electrical current, and provide the electrical current to motors that drive the rotors 103 or other propulsion system components.

The first aircraft 901 is shown carrying a capture line 906 that is connected to a downline apparatus 970. The downline apparatus 970 can include an anchor 971 (e.g., a pulley) and a tension device 972 (e.g., an elastic, spring-bearing, and/or other shock absorbing device) for handling and/or controlling the motion of the capture line 906 and the captured second aircraft (not shown in FIG. 9).

One feature of embodiments of the system described above with reference to FIG. 9 is that the wireless system for transmitting energy from the ground to the first aircraft can simplify the flight operations of the first aircraft, for example, by reducing limitations imposed by the power transmission line 731 discussed above with reference to FIG. 7. Conversely, using a wired or direct power transmission link of the type described above with reference to FIG. 7 can provide energy more efficiently than a wireless link and the energy conversion processes associated therewith.

Figure 10:
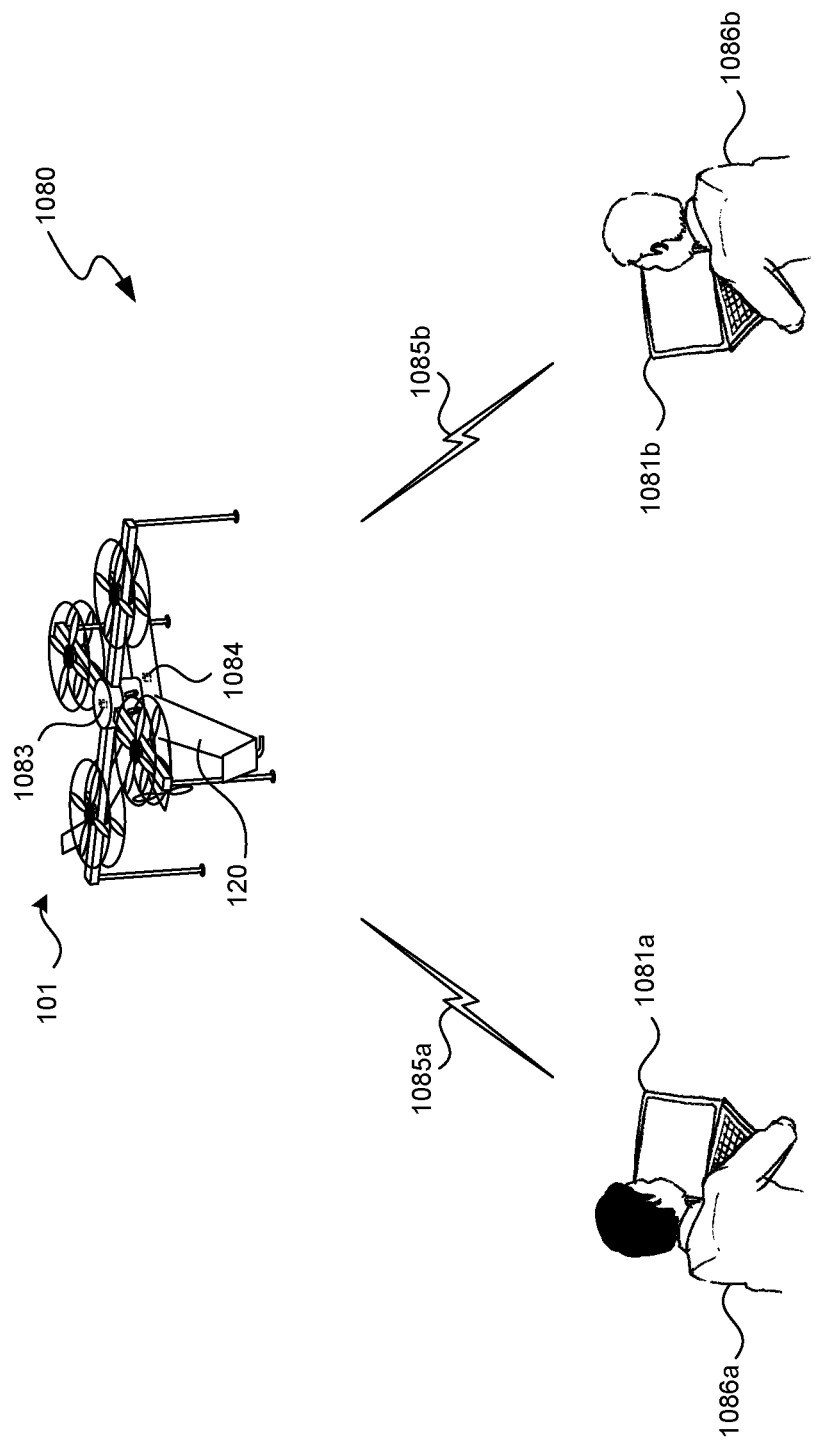
FIG. 10 illustrates controllers configured to control first and/or second aircraft, in accordance with embodiments of the present technology.

Referring now to FIG. 10, in any of the embodiments described above, the systems include one or more controllers 1080 to monitor and direct the operations of the various aircraft. For example, the first aircraft 101 can include a first on-board controller 1083, and the second aircraft 120 can include a second on-board controller 1084. Each of these controllers directs the movement of the respective aircraft via signals directed to the propulsion systems, movable aerodynamic surfaces, and/or other aircraft components. In some embodiments, the operation of the first and second aircraft 101, 120 can be completely autonomous, with each aircraft pre-programmed before operation. In some embodiments, both aircraft are controlled via a single ground-based controller, and in still some embodiments, each aircraft is controlled by a separate controller. Accordingly, the overall controller 1080 can include a first off-board controller 1081a (e.g. a first ground station) operated by a first operator 1086a and in communication with the first aircraft 101 via a first communication link 1085a. The controller 1080 can further include a second off-board controller 1081b (e.g., a second ground station), operated by a second operator 1086b, and in communication with second aircraft 120 via a second communication link 1085b. The first and second operators 1086a, 1086b can communicate with each other, e.g. orally by being co-located next to or near each other, or via phone, two-way radio or any other suitable longer range communication device. The off-board controllers can perform any of a wide variety of diagnostic and informational tasks, in addition to providing control instructions to the first and second aircraft. For example, the controllers can provide an automated or partially automated checklist and countdown procedure for an aircraft launch and/or recovery.

Figure 11:
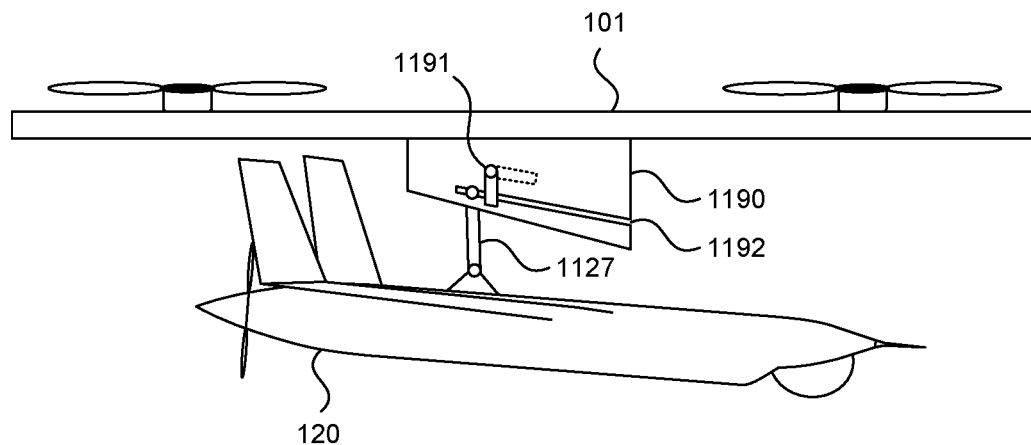
FIG. 11 is a partially schematic illustration of a first aircraft having a launch fixture for carrying a second aircraft, in accordance with some embodiments of the present technology.
Figure 12:
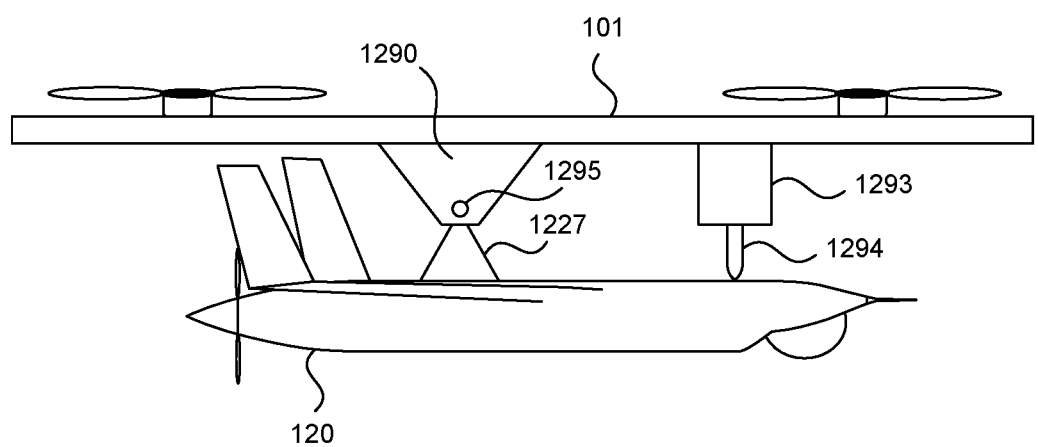
FIG. 12 is partially schematic illustration of a first aircraft having a launch fixture for carrying a second aircraft, in accordance with some embodiments of the present technology.
Figure 13:
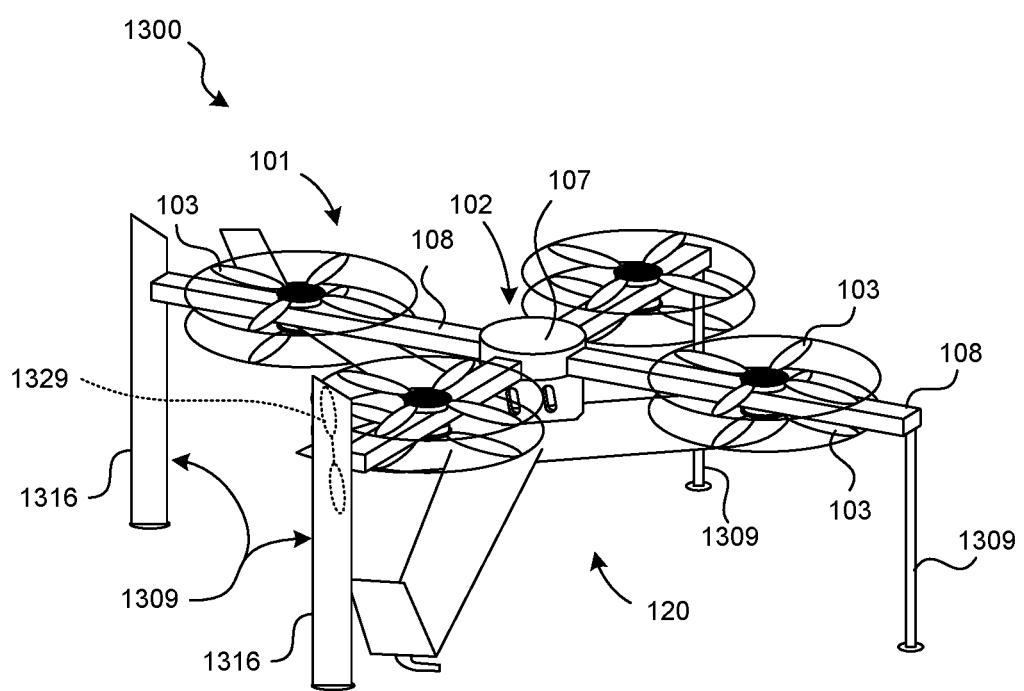
FIG. 13 illustrates a representative first aircraft carrying a representative second aircraft during operations in accordance with some embodiments of the present technology.

FIGS. 11-13 illustrate first and second aircraft configured in accordance with some embodiments of the present technology. Beginning with FIG. 11, a representative first aircraft 101 can include a launch fixture 1190 releasably attached to an attachment fixture 1127 carried by the second aircraft 120. In a particular aspect of this embodiment, the attachment fixture 1127 fits into a corresponding slot 1192 of the launch fixture 1190, and the launch fixture 1190 further includes a release mechanism 1191. The release mechanism 1191 can obstruct or prevent motion of the attachment fixture 1127 until launch, at which point, the release mechanism 1191 can be moved to a release position (as indicated in dotted lines in FIG. 11), allowing the second aircraft 120 to slide downwardly and away from the first aircraft 101 via the slot 1192.

In some embodiments, as shown in FIG. 12, the first aircraft 101 includes a launch fixture 1290 that can include a pivot pin 1295 that releasably engages with a corresponding attachment fixture 1227 carried by the second aircraft 120. For example, the pivot pin 1295 can translate into or out of the plane of FIG. 12 to disengage from the attachment fixture 1227. The first aircraft 101 can further include a positioning apparatus 1293 having a plunger 1294 that, when activated, forces the nose of the second aircraft 120 downwardly. During a representative launch operation, the pivot pin 1295 and plunger 1294 are actuated in sequence to both release the second aircraft 120 and force the nose of the second aircraft 120 downwardly so that it (a) picks up sufficient air speed to fly on its own, and (b) reduces the likelihood for interference with the first aircraft 101. For example, the pin 1295 is disengaged first, and, upon an indication that the pin 1295 has been successfully disengaged, the plunger 1294 then operates to push down the nose of the second aircraft 120. In another example, the plunger 1294 is actuated first to place the second aircraft 120 in a downward-facing orientation, before the pin 1295 is released. In any of these examples, the second aircraft 120 can be initially carried in a horizontal attitude, for example, as the first aircraft 101 flies horizontally to a launch site. One advantage of this arrangement is that it is expected to reduce the drag on both the second aircraft 120 and the first aircraft 101 during this flight.

FIG. 13 illustrates further details of a representative system 1300 including the first aircraft 101 and second aircraft 120 shown in FIG. 2. The first aircraft 101 can include an airframe 102 formed by a central portion 107 and multiple, outwardly extending arms 108. Each arm 108 can support one or more rotors 103. For example, in some embodiments (as shown in FIG. 13), each of the four arms supports two counter-rotating rotors 103. The first aircraft 101 can further include multiple landing gear 1309 and a launch fixture 190 that are configured to allow the first aircraft 101 to support the second aircraft 120 while the first aircraft 101 is on the ground. In this position, the landing gear 1309 provide enough ground clearance for the second aircraft 120 to allow a propeller 1329 of the second aircraft 120 to operate. In this particular example, the landing gear 1309 can include four elements, each configured to support one of the four arms 108. One or more of the landing gear elements (e.g., two) can be further configured to have flat, vertically extending surfaces that operate as vertical stabilizers 1316 to enhance the in-flight stability of the first aircraft 1301.

FIGS. 14A-14D illustrate systems and methods for capturing unmanned aerial vehicles in a marine or other water-based environment, in accordance with some embodiments of the present technology. For purposes of illustration, capture operations are shown in FIGS. 14A-14D. In some embodiments, the same or different aircraft can be used to launch the UAVs, for example, in accordance with the techniques described above.

Figure 14A:
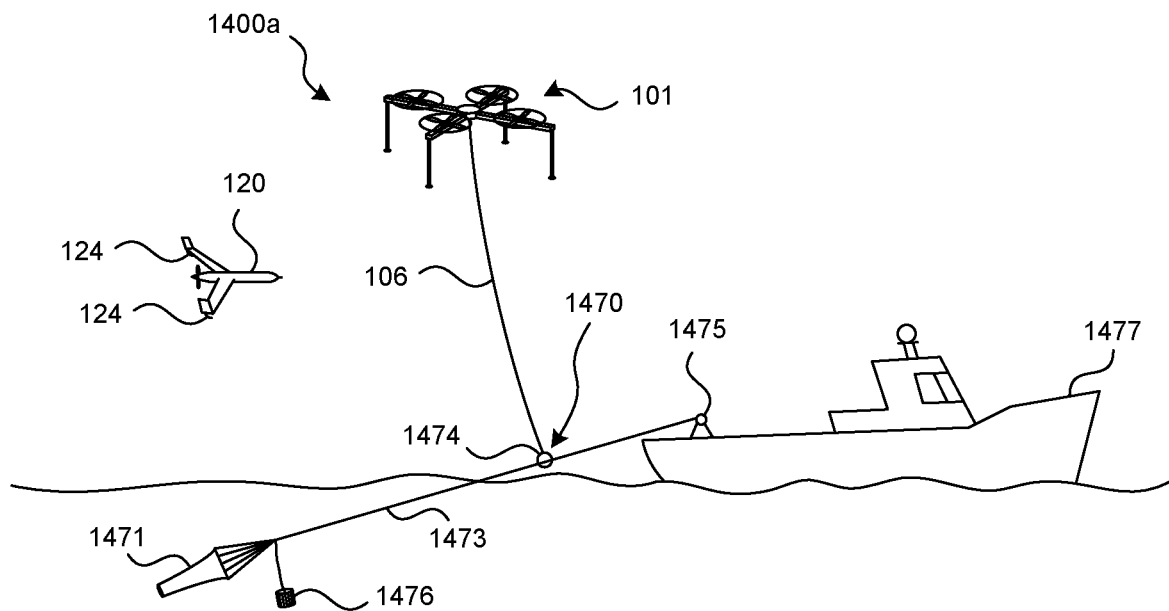
FIG. 14A is a partially schematic illustration of a first aircraft configured to operate in a marine environment, in accordance with some embodiments of the present technology.
Figure 14B:
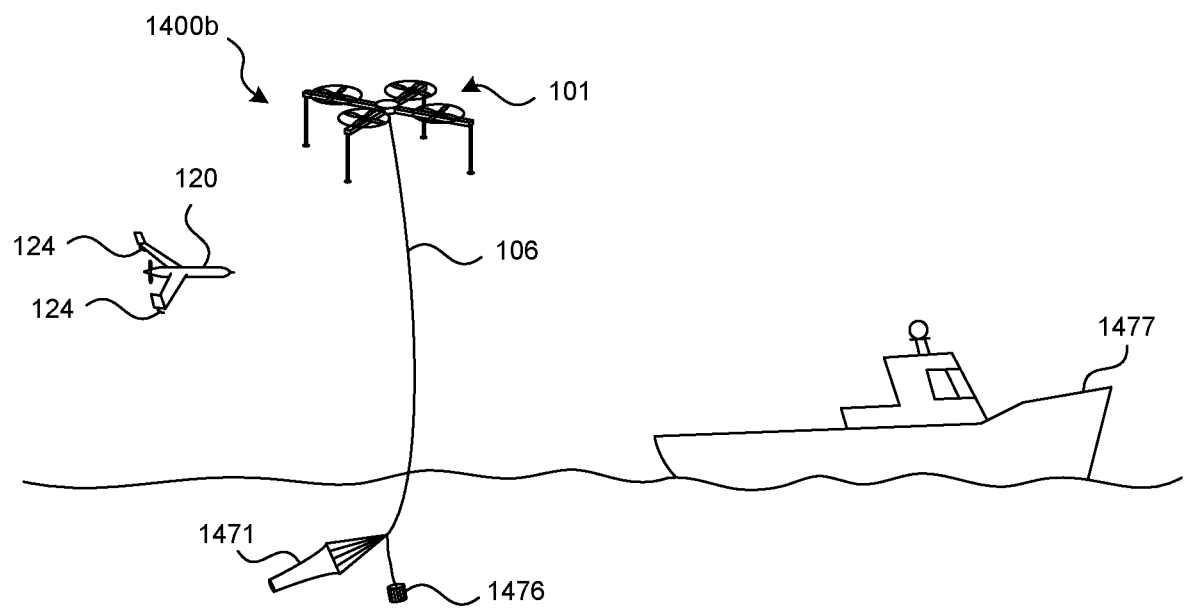

Beginning with FIG. 14A, a representative system 1400*a* can include a first aircraft 101 configured to capture and/or launch a second aircraft 120. Accordingly, the first aircraft 101 can carry a capture line 106 that is in turn connected to a downline apparatus 1470. The downline apparatus 1470 can be carried at least in part by a water-borne vessel 1477 (e.g., a boat, ship, barge, and/or other suitable platform), and can include a drag cable 1473 connected to the capture line 106 with a connecting device 1474 (e.g., a slip ring or other suitable device). The drag cable 1473 is connected to a drag cable deployment device 1475 (e.g., a winch) that can be used to reel the drag cable 1473 in and out. The drag cable 1473 can be connected at its opposite end to an immersible anchor, e.g., a sea anchor 1471 and (optionally), an additional mass 1476, which keeps the drag cable 1473 in a stable orientation relative to the capture line 106 and the vessel 1477.

In one mode of operation, the second aircraft 120 flies into the capture line 106, engaging wing tip hooks 124 with the capture line 106 in a manner generally similar to that described above. The drag cable deployment device 1475 can then be used to reel in the capture line 106, the sea anchor 1471, and the mass 1476, before or after the first aircraft 101 descends to the vessel 1477 to deposit the captured second aircraft 120.

A system 1400*b* in accordance with some embodiments (shown in FIGS. 14B-14D) includes a first aircraft 101 that operates without being attached to the vessel 1477 via the drag cable 1473. Instead, the first aircraft 101, with the capture line 106, sea anchor 1471 and optional additional mass 1476, can be delivered by the vessel 1477 to a particular location, and released. After being released, the first aircraft 101 captures the second aircraft 120 in a manner generally similar to that discussed above. The first aircraft 101 then flies the second aircraft 120 to the vessel 1477. For example, as shown in FIG. 14C, the first aircraft 101 can lift the second aircraft 120, the sea anchor 1471 and the additional mass 1476 from the water and fly toward the vessel 1477. At the vessel 1477, as shown in FIG. 14D, the first aircraft 101 can lower the second aircraft 120 to be secured at the vessel 1477, and can then itself land on the vessel 1477.

In at least some of the embodiments described above with reference to FIGS. 1-14D, once the second aircraft 120 is captured, it is retrieved by gradually lowering the first aircraft 101 toward the ground (or another support platform) until the second aircraft 120 makes contact with the ground and can be disengaged from the capture line. In other embodiments, systems can include retrieval devices specifically configured to facilitate the process of successfully bringing the second aircraft to the ground and disengaging it from the capture line, while eliminating or significantly reducing the likelihood for damage to the second aircraft. Representative embodiments are described below with reference to FIGS. 15A-27D. Representative embodiments can also reduce or eliminate the need for personnel to be positioned beneath the first and/or second aircraft during the retrieval process.

Figure 15A:
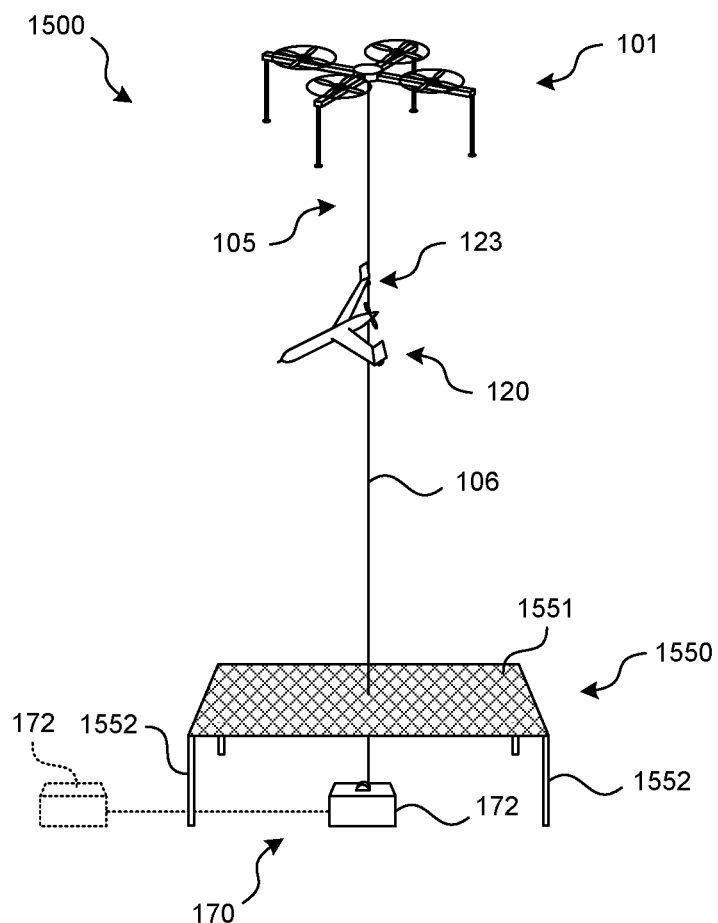
FIGS. 15A-15B are partially schematic illustrations of a system that includes a retrieval device incorporating a net in accordance with some embodiments of the present technology.

Beginning with FIG. 15A, a representative system 1500 includes a representative first aircraft 101 configured to capture a representative second aircraft 120 via a first capture device 105 (e.g., a capture line 106) and a second capture device 123 (e.g., hooks carried on the wings of the second aircraft 120). A corresponding retrieval device 1550 configured in accordance with a representative embodiment includes a net 1551 positioned above the ground and held in place via one or more standoffs 1552. A downline apparatus 170 can include a tension device 172 positioned directly beneath the net 1551 (as shown in solid lines) or positioned laterally away from the net 1551 (as shown in dashed lines) so as not to be directly beneath the net 1551. In either embodiment, the tension device 172 can provide tension in the capture line 106 and/or can operate to reel the capture line in and/or out.

During operation, the tension provided by the tension device 172 can be reduced or eliminated to allow the capture line 106 to pay out as the first aircraft 101 ascends prior to capturing the second aircraft 120. After the first aircraft 101 has captured the second aircraft 120, the tension device 172 can aid in reeling the capture line 106 in as the second aircraft 120 is gently lowered to the net 1551. Once the second aircraft 120 is on or in the net 1551, an operator can easily disengage it from the capture line 106 without inadvertently bringing it into contact with the ground during the process.

Figure 15B:
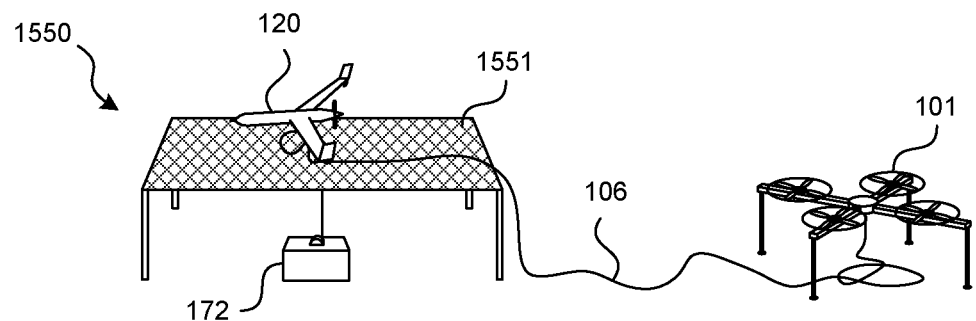

FIG. 15B illustrates the retrieval device 1550 after the first aircraft 101 has deposited the second aircraft 120 on or in the net 1551, and has landed off to the side. In some embodiments, the standoffs 1552 can be sized to allow the operator to easily lean over the net 1551 to disengage the second aircraft 120 from the capture line 106. An advantage of this arrangement is that the net 1551 can reduce or eliminate the likelihood for damaging the second aircraft 120 between the time it is captured and the time it is released from the capture line 106 in preparation for another flight. In at least some embodiments, particular elements of the second aircraft 120 (e.g., forward-extending pitot tubes and/or transparent camera housings) can be particularly sensitive to such damage. The size of the net 1551 can depend on the size and/or shape of the second aircraft 120. For example, the net 1551 can have a size of about 10 feet by 10 feet to retrieve a ScanEagle® aircraft (manufactured by Insitu, of Bingen, Wash.) having a 10.2 foot wing span and a length of 4.5 feet.

Figure 16:
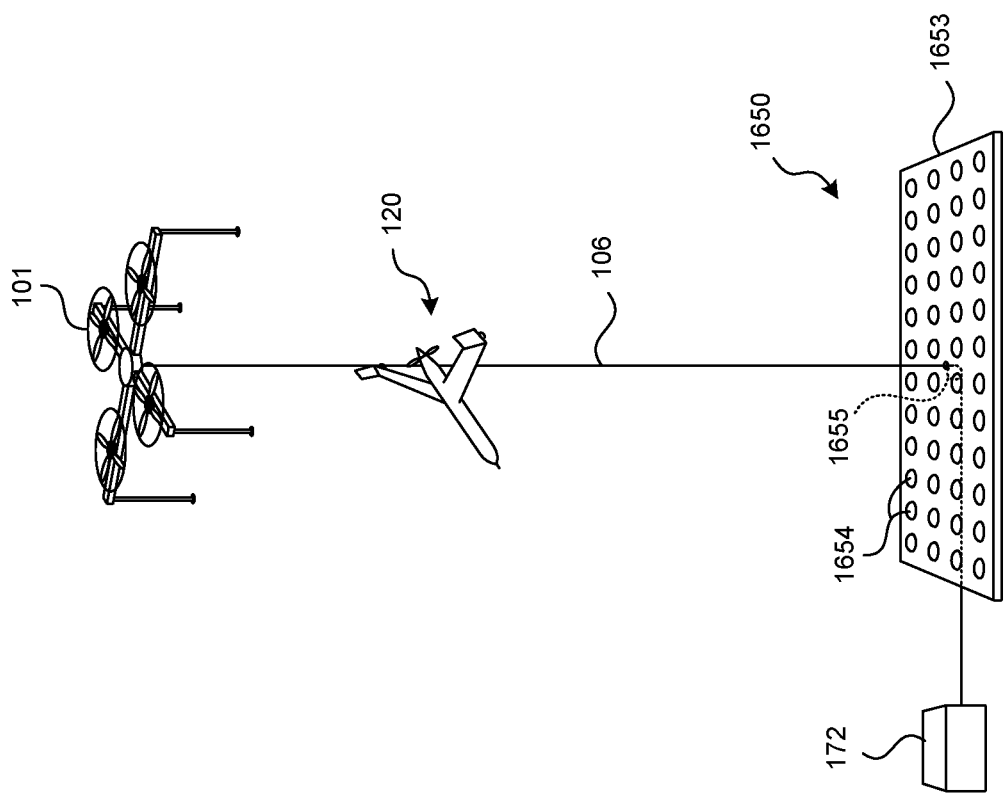
FIG. 16 is a partially schematic illustration of a system that includes a retrieval device incorporating a pad in accordance with some embodiments of the present technology.

FIG. 16 is a partially schematic illustration of a system that includes a retrieval device 1650 having a resilient and/or cushioning pad 1653 through which the capture line 106 passes. In some embodiments, the pad 1653 can be inflatable so as to provide a compact configuration when not in use. In such embodiments, the pad 1653 can include a non-inflated channel that allows the capture line to pass through. The pad 1653 can include open or closed cell foams, or other suitable cushioning materials. As described above with reference to FIGS. 15A-15B, the associated tension device 172 can be positioned off to the side of the pad 1653, with a pulley 1655 used to guide the capture line 106 to the offset tension device 172. In some embodiments, the pad 1653 can include anti-slide features 1654 that at least reduce (or eliminate) the likelihood for the second aircraft 120 to slip or slide off the pad 1653 during the retrieval operation. For example, the anti-slide features 1654 can include bumps, grooves, and/or other texture elements that limit the movement of the second aircraft 120 once it is on the pad 1653.

Figure 17:
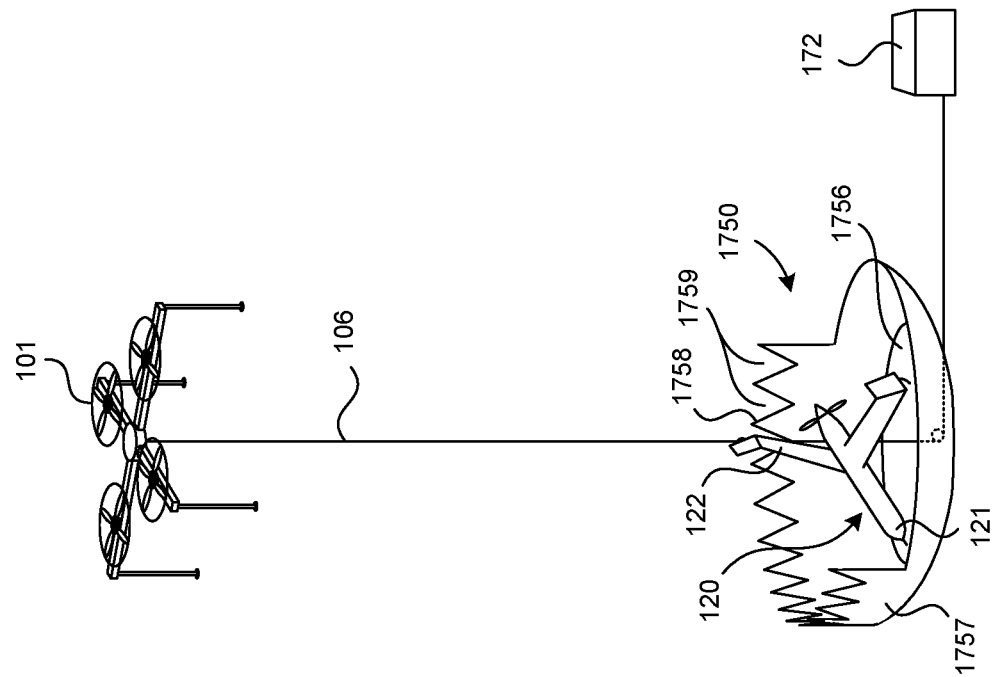
FIG. 17 is a partially schematic illustration of a system having a retrieval device that includes a wing support member configured in accordance with some embodiments of the present technology.

FIG. 17 illustrates embodiments in which a representative retrieval device 1750 is configured to engage one of the wings 122 of the second aircraft 120. Accordingly, the retrieval device 1750 can include a base 1756 and a wing support member 1757 (e.g., a wall) that extends upwardly from the base 1756. The wing support member 1757 can include multiple projections or serrations 1758 separated by corresponding gaps 1759 that are positioned to engage the wing 122, while allowing the fuselage 121 to come to rest on the base 1756. Accordingly, the base 1756 can be padded and/or can otherwise be configured to reduce any negative impact on the fuselage 121 or the opposite wing 122.

In one aspect of some embodiments, e.g., as shown in FIG. 17, the retrieval device 1750 is configured to engage only one of the wings 122. In some embodiments described below with reference to FIGS. 18A and 18B, a corresponding retrieval device 1850 is configured to engage either both wings (FIG. 18A) or one wing (FIG. 18B) while the fuselage 121 is positioned outside a corresponding wall or other support member. Beginning with FIG. 18A, the retrieval device 1850 can include a wing support member 1857 extending upwardly from a base 1856 and having projections 1858 and gaps 1859 that operate generally as discussed above with reference to FIG. 17. The tension device 172 can be positioned to the side of the wing support member 1857. The wing support member 1857 can have opposing portions (e.g., that form a complete circle, or a "C" shape, or another suitable open or closed shape) that engage both wings 122 of the second aircraft 120, while the fuselage 121 is positioned downwardly between the opposing portions.

Figure 18B:
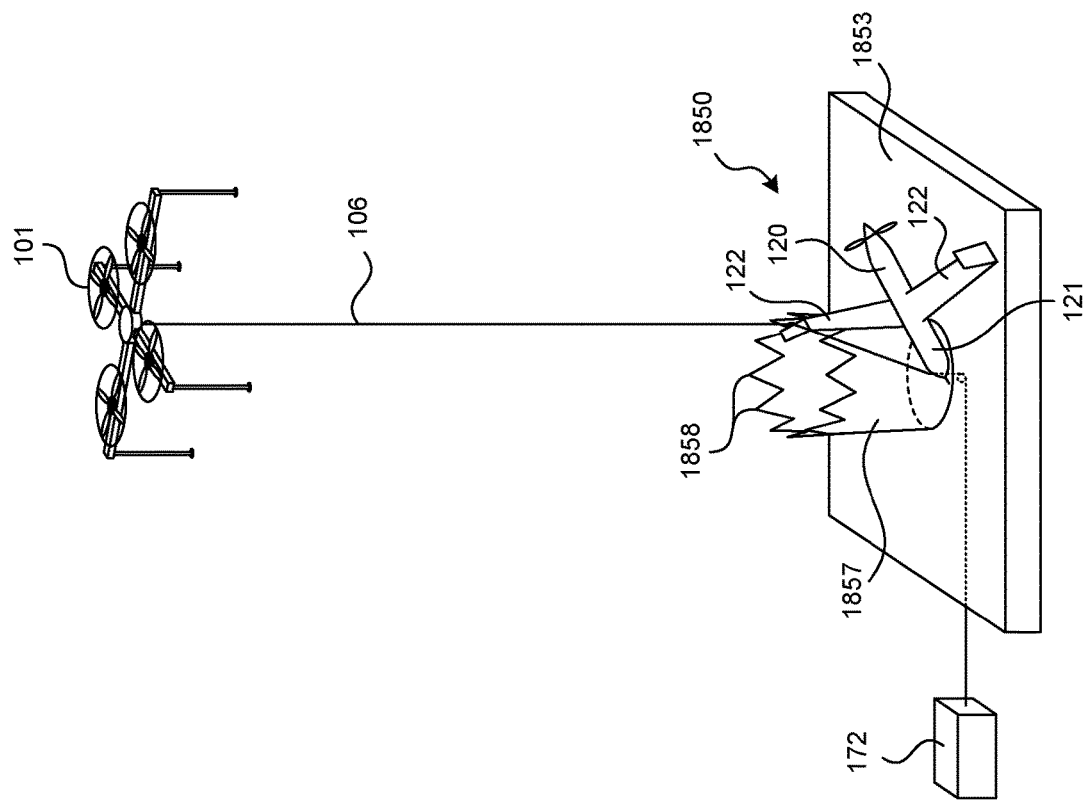
FIGS. 18A-18B illustrate a system that includes a retrieval device having a wing support member operating in accordance with some embodiments of the present technology.
Figure 18A:
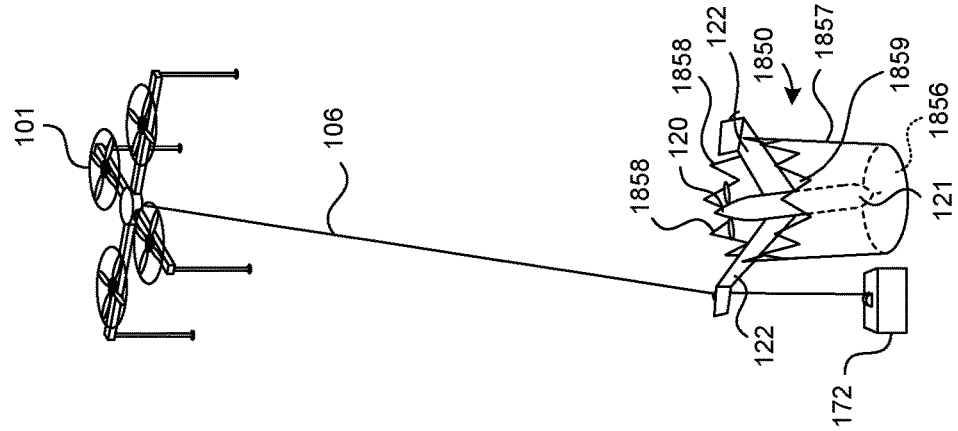

In at least some instances, the retrieval device 1850 can be configured to operate even if the fuselage 121 is not positioned downwardly within the enclosed or partially enclosed space formed by the wing support member 1857. For example, as shown in FIG. 18B, the wing support member 1857 can be positioned on, over, or adjacent to a pad 1853. If only one wing 122 of the second aircraft 120 engages the wing support member 1857, the remaining wing 122 can come to rest gently on the pad 1853.

Figure 19:
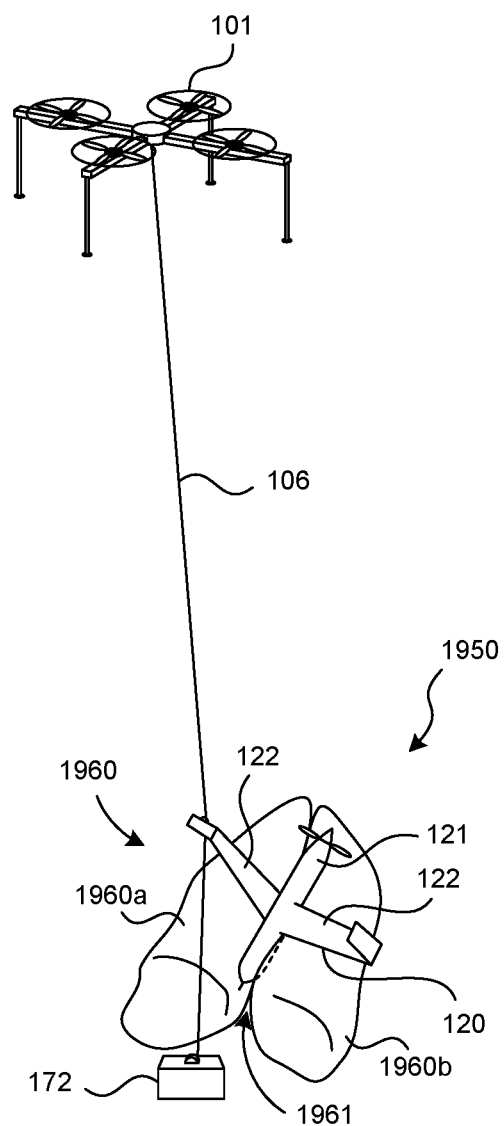
FIG. 19 is a partially schematic illustration of a system that includes a retrieval device having one or more inflatable bladders positioned to support an aircraft in accordance with some embodiments of the present technology.

FIG. 19 illustrates a retrieval device 1950 that includes one or more inflatable bladders 1960 configured in accordance with some embodiments of the present technology. The inflatable bladder(s) can be sized, shaped and positioned to engage with the second aircraft 120. For example, the retrieval device 1950 can include two inflatable bladders 1960a, 1960b positioned adjacent to each other to form a depression 1961 between them. The tension device 172 can be positioned so that the capture line 106 extends up through the depression 1961. After capturing the second aircraft 120, the first aircraft 101 lowers the second aircraft 120 and the capture line 106 until the fuselage 121 rests in the depression 1961, and the wings 122 rest on the inflatable bladders 1960a, 1960b. In some embodiments, the inflatable bladders 1960a, 1960b can be shaped (and/or the depression 1961 can be sloped) so that the second aircraft 120 tends toward the orientation shown in FIG. 19, even if it is not in that orientation when it initially makes contact with the inflatable bladders 1960a, 1960b.

Figure 20:
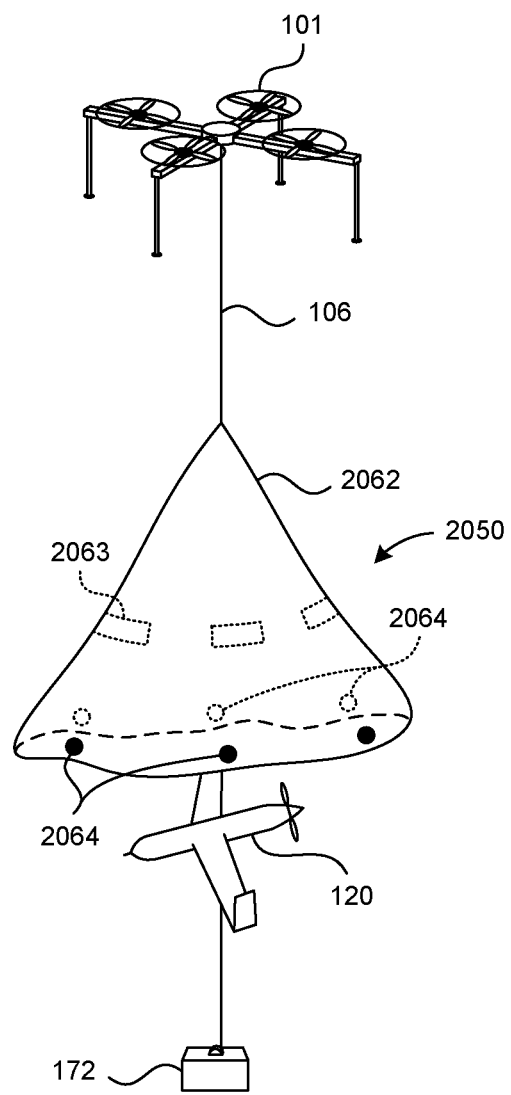
FIG. 20 is a partially schematic illustration of a system that includes a retrieval device having a sheet that encloses an aircraft in accordance with some embodiments of the present technology.

FIG. 20 is a partially schematic illustration of a retrieval device 2050 that includes a sheet 2062 carried by the capture line 106 at a position above the location at which the second aircraft 120 engages the capture line 106. The sheet 2062 may initially be furled, and is then unfurled into the shape shown in FIG. 20 after the second aircraft 120 is captured, or the sheet 2062 can have the unfurled configuration both before and after capture. In either arrangement, once the second aircraft 120 is captured, the sheet 2062 can be lowered over and around the second aircraft 120 to protect it. To facilitate this operation, the sheet 2062 can optionally include padding elements 2063 positioned to align with particularly sensitive features of the second aircraft and/or to provide cradling for the second aircraft. When the sheet 2062 is dropped, air pressure will naturally keep it open it until contacts the second aircraft 120. At this point, the free edges of the sheet 2062 will drape down around the second aircraft 120. Once the sheet 2062 has been draped over the second aircraft 120, closure devices 2064 can close around the second aircraft 120 from below. For example, the closure devices 2064 can include magnets that are brought together with each other (e.g., as the sheet 2062 drapes) to enclose the second aircraft 120 within the sheet 2062.

Figure 21:
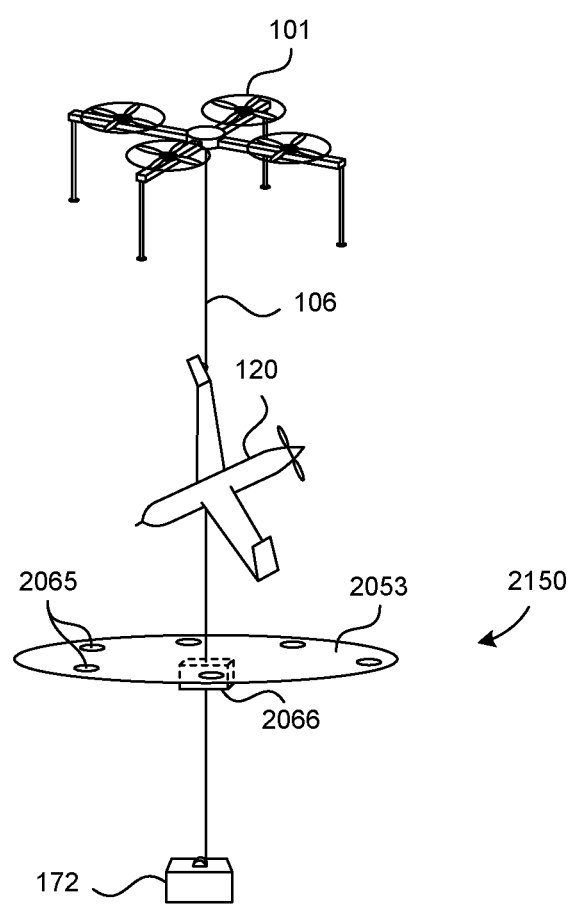
FIG. 21 is a partially schematic illustration of a system having a retrieval device that includes a support pad that advances upwardly toward a captured aircraft in accordance with some embodiments of the present technology.

FIG. 21 is a partially schematic illustration of a retrieval device 2150 having a support device (e.g., a platform or pad) 2053 that is moved toward the second aircraft 120, rather than vice-versa. Accordingly, the retrieval device 2150 can include a climber 2066 (e.g., a mechanical or electromechanical climber, generally similar to those manufactured by the climbing equipment industry) that moves the support device 2053 upwardly along the capture line 106 to engage with the second aircraft 120. After the second aircraft 120 is resting on or otherwise engaged with the support device 2053, e.g., in a generally horizontal orientation, the first aircraft 101 can lower the assembly of the second aircraft 120 and the support device 2053 together to the ground. Accordingly, the support device 2053 can have sufficient rigidity to support the second aircraft 120, while also remaining lightweight and compact. In some embodiments, the support device 2053 can include airflow holes 2065 that both reduce the weight of the device 2053 and reduce the likelihood that wind will catch and move the support device 2053 in an unpredictable or otherwise undesirable way. The tension device 172 can be eliminated in at least some embodiments, with the tension in the capture line 106 provided instead by the weight of the support device 2053. Accordingly, this embodiment may be particularly suitable for over-water capture and retrieval operations.

Figure 22A:
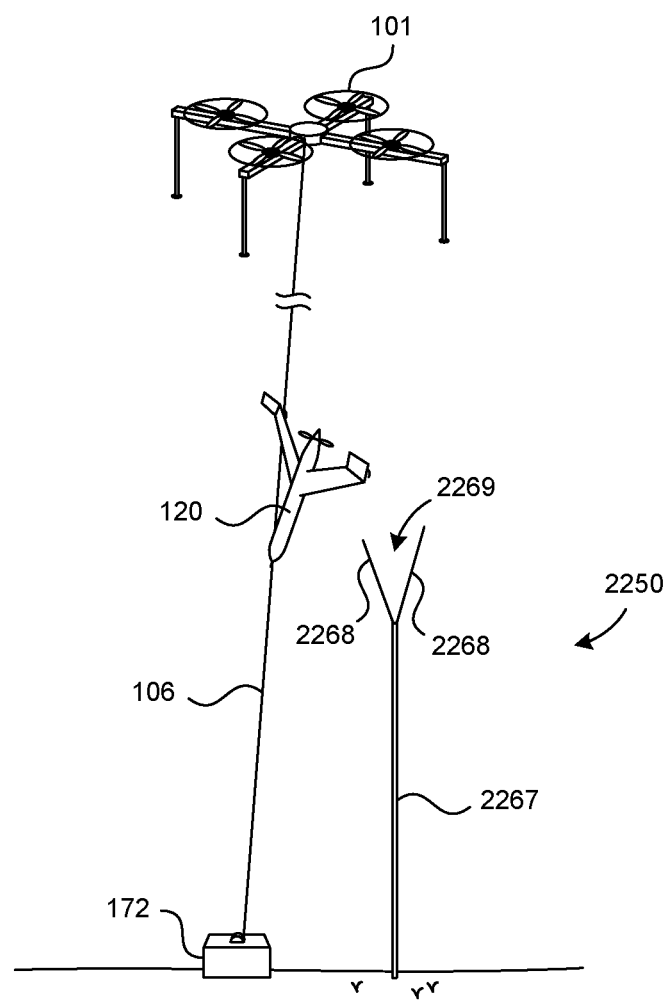
FIGS. 22A-22B illustrate a system incorporating a retrieval device having an upright mast to engage with a capture line in accordance with some embodiments of the present technology.
Figure 22B:
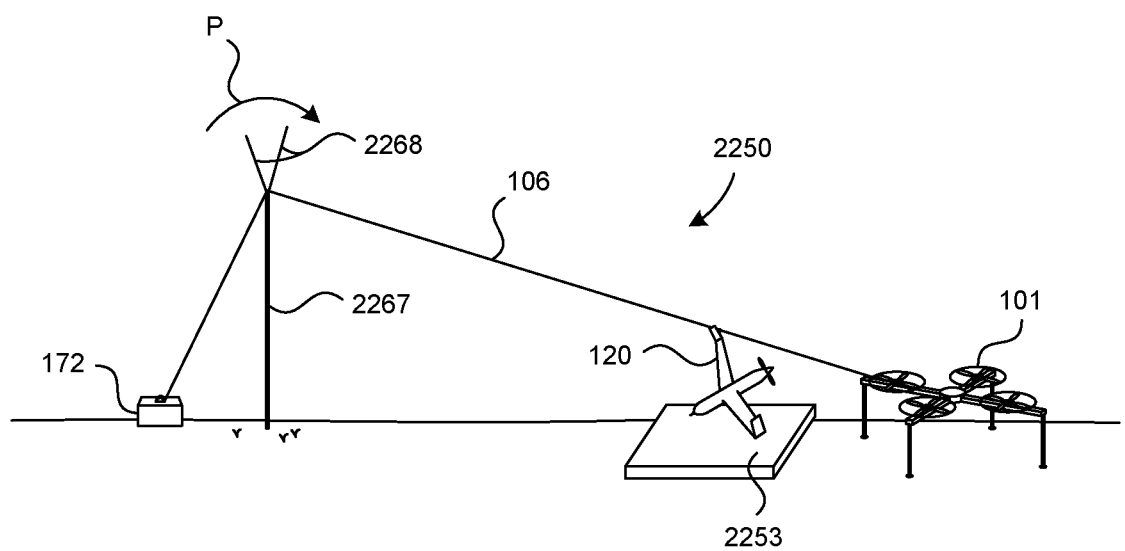

FIGS. 22A and 22B illustrate a retrieval device 2250 that includes a mast 2267 having one or more uprights 2268 that form a crotch 2269. During operation, the first aircraft 101 maneuvers the capture line 106 so that it is positioned in the crotch 2269 at a location below the second aircraft 120. As shown in FIG. 22B, the first aircraft 101 then lands adjacent to the mast 2267, while the uprights 2268 support at least a portion of the capture line 106 above the ground (or other landing surface). Optionally, the system can further include a pad 2253 positioned to cushion the second aircraft 120 as it touches down. Whether or not the pad 2253 is included, the velocity at which the second aircraft 120 makes contact with the ground is reduced compared with a vertical landing, as a result of the pivoting action of the capture line 106 about the mast 2267, indicated by arrow P.

Figure 23C:
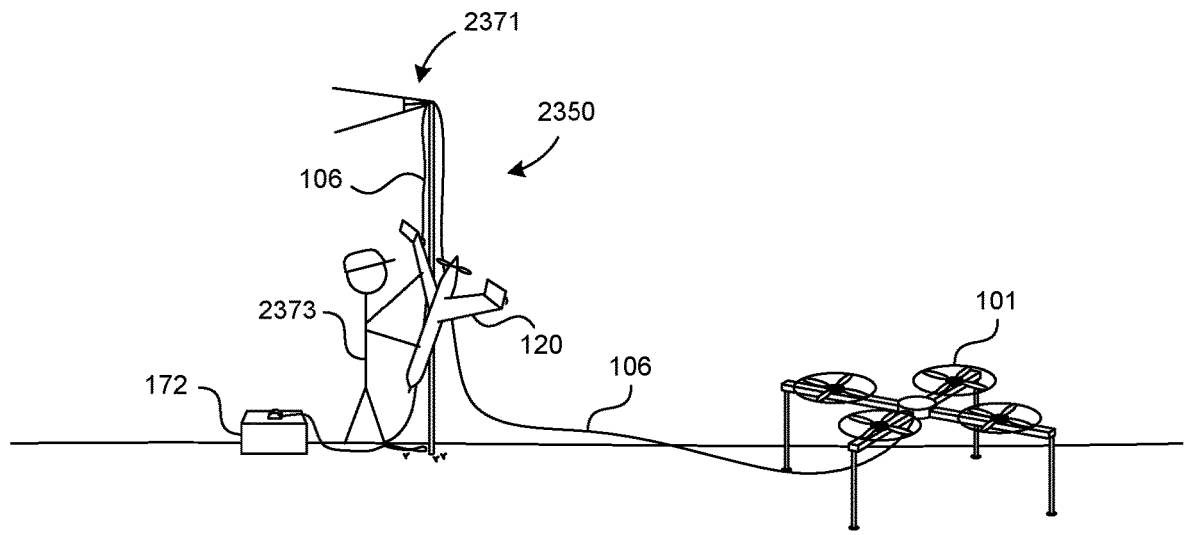
Figure 23D:
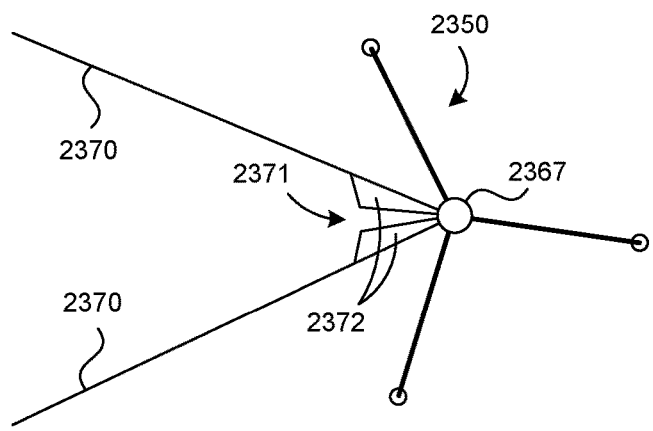

FIGS. 23A-23D illustrate a retrieval device 2350 having an arrangement generally similar to that discussed above with reference to FIGS. 22A and 22B, but with additional features to firmly secure the capture line 106. Accordingly, the retrieval device 2350 can include a generally upstanding mast 2367, outwardly extending arms 2370, and a clamp 2371 having one or more clamp elements 2372. During operation (as shown in FIG. 23B), the first aircraft 101 lowers the second aircraft 120 until it is above the ground, but below the arms 2370. The first aircraft 101 is then maneuvered so that the capture line above the arms 2370 engages with the clamp 2371, which grabs onto and (releasably) secures the capture line 106. As shown in FIG. 23C, the first aircraft 101 then lands adjacent to the retrieval device 2350, and an operator 2373 removes the second aircraft 120 from the capture line 106. FIG. 23D illustrates a top view of the retrieval device 2350, showing the clamp elements 2372. In at least some embodiments, the clamp elements 2372 can be automatically triggered by contact with the capture line 106 (FIG. 23C), so as to quickly engage the capture line 106 without the operator having to do so manually. In some embodiments, the operator can manually close the clamp 2371, either as a back-up to the foregoing automated operation, or as part of normal operation.

Figure 24A:
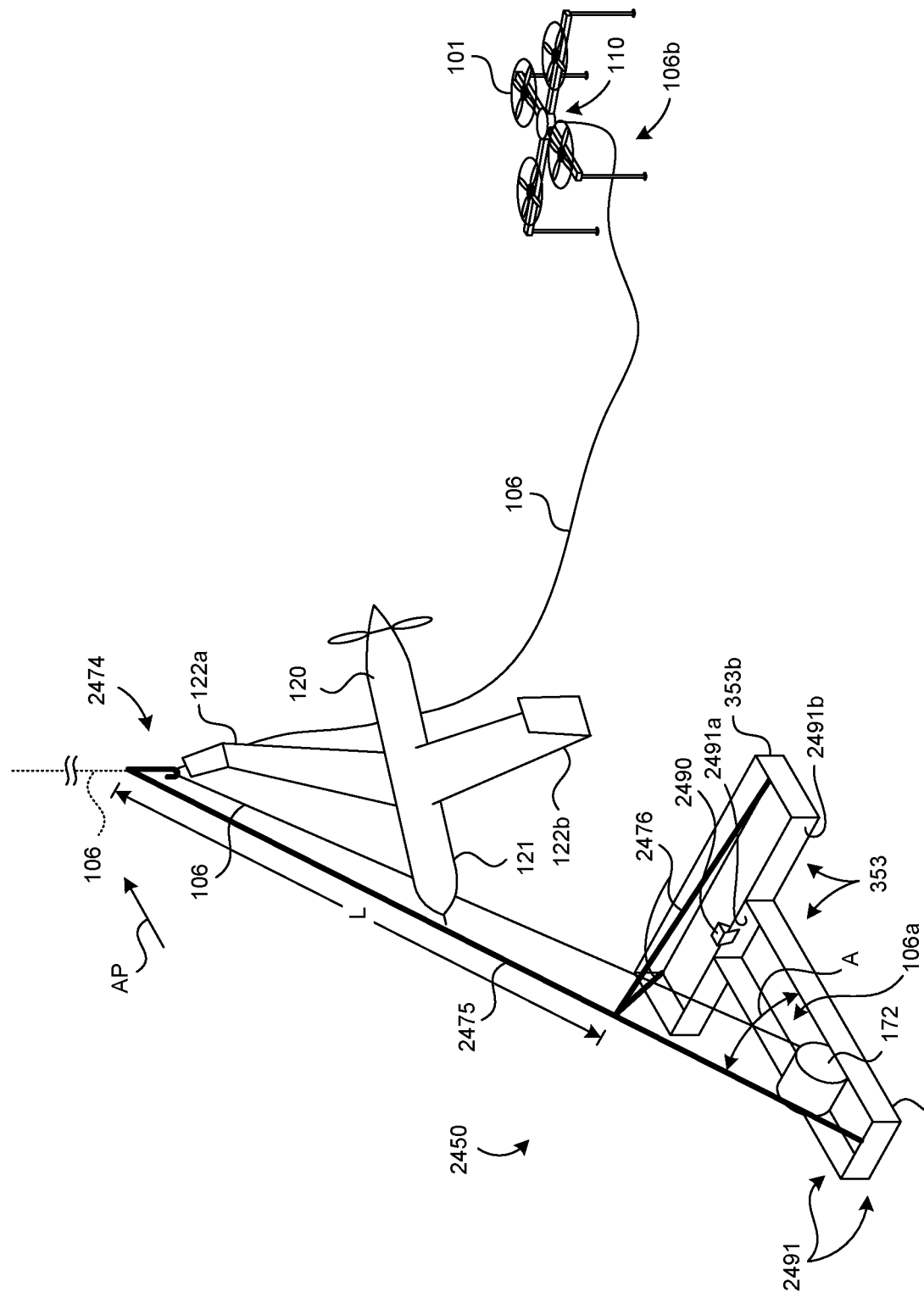
FIG. 24A is a partially schematic, isometric illustration of a system that includes a retrieval device having a boom supporting a capture line in accordance with some embodiments of the present technology.

FIG. 24A is a partially schematic illustration of a retrieval device 2450 that includes a boom 2475 having a line support element 2474 engaged with the capture line 106. The boom 2475 can be supported by one or more boom supports 2476, and the line support element 2474 can include a hook, a pulley, and/or another suitable device. During a representative capture operation, the first aircraft 101, which is initially positioned to hover above the retrieval device 2450, maneuvers the capture line 106 into engagement with the line support element 2474. In another representative operation, the capture line 106 can be engaged with the line support element 2474 earlier in the operation, e.g., prior to the first aircraft 101 ascending. In either operation, the first aircraft 101 hovers above the retrieval device 2450, with the capture line 106 extending downwardly (as shown in dashed lines). The second aircraft 120 can approach the capture line 106 in a direction aligned with the length L of the boom 2475 to control loading on the boom, as indicated by arrow AP. Once the second aircraft 120 has been captured at a location above the line support element 2474, the tension device 172 can reel in the capture line 106 until the second aircraft 120 has the position shown in FIG. 24A. At that point, the first aircraft 101 can land, off to the side of the retrieval device 2450 (as is also shown in FIG. 24A), and the operator can remove the second aircraft 120 from the capture line.

As shown in FIG. 24A, the capture line 106 can include a first portion 106a attached to the tension device 172, and a second portion 106b attached to the first aircraft 101, e.g. via a fixture 110. The boom 2475 can be sized and arranged to be deployed in a manner that reduces or eliminates the likelihood for the second aircraft 120 to strike the boom 2475, the boom supports 2476, and/or other elements of the retrieval device 2450. For example, the boom 2475 can have a cantilevered length L and an inclination angle or elevation angle A that together provide a sufficient offset between the elements of the retrieval device 2450 and the second aircraft 120. Accordingly, the second aircraft 120 can have a captured wing 122a that is pulled up toward (e.g., in contact with) the line support element 2474, and an opposing wing 122b that hangs downwardly. With the proper size and configuration of the boom 2475, the opposing wing 122b will not strike the boom 2475 or other elements of the retrieval device 2450, even in high winds. Similarly, this arrangement can prevent the fuselage 121 and/or other portions of the second aircraft 120 from striking the boom 2475 or other elements of the retrieval device 2450.

In some embodiments (e.g., as shown in FIG. 24A), one or more shipping containers 353 (described above with reference to FIG. 3), or elements of the shipping containers, can be used to support the boom 2475, the tension device 172, and the boom supports 2476. In some embodiments, a first shipping container element 353a (e.g., a container body) carries the boom 2475 and the tension device 172 in the deployed configuration shown in FIG. 24A. A second shipping container element 353b (e.g., a lid for the container body) carries the deployed boom supports 2476. Each container element can include multiple sides 2491, e.g., a pair of short sides 2491a and a pair of long sides 2491b. In some embodiments, the short side 2491a of one container element (e.g. the first shipping container element 353a) is releasably secured to the long side 2491b of the second shipping container element 353b, via a securement device 2490. The securement device 2490 can include a clamp, one or more nuts and bolts, and/or other suitable fasteners. In any of these embodiments, the securement device 2490 can prevent or at least restrict the shipping container elements 353a, 353b from moving relative to each other so that they can more securely position the boom 2475 in its deployed, elevated configuration. The lengthwise orientation of the first shipping container element 353a can provide stiffness aligned with the approach directed AP of the second aircraft 120. The widthwise orientation of the second shipping container element 353b can provide a wide, stabilizing stance for the boom supports 2476. The overall arrangement provides a simple, compact configuration that makes use of the shipping containers 353, whether or not the containers are also used for shipping the components they support in the deployed configuration.

Figure 24B:
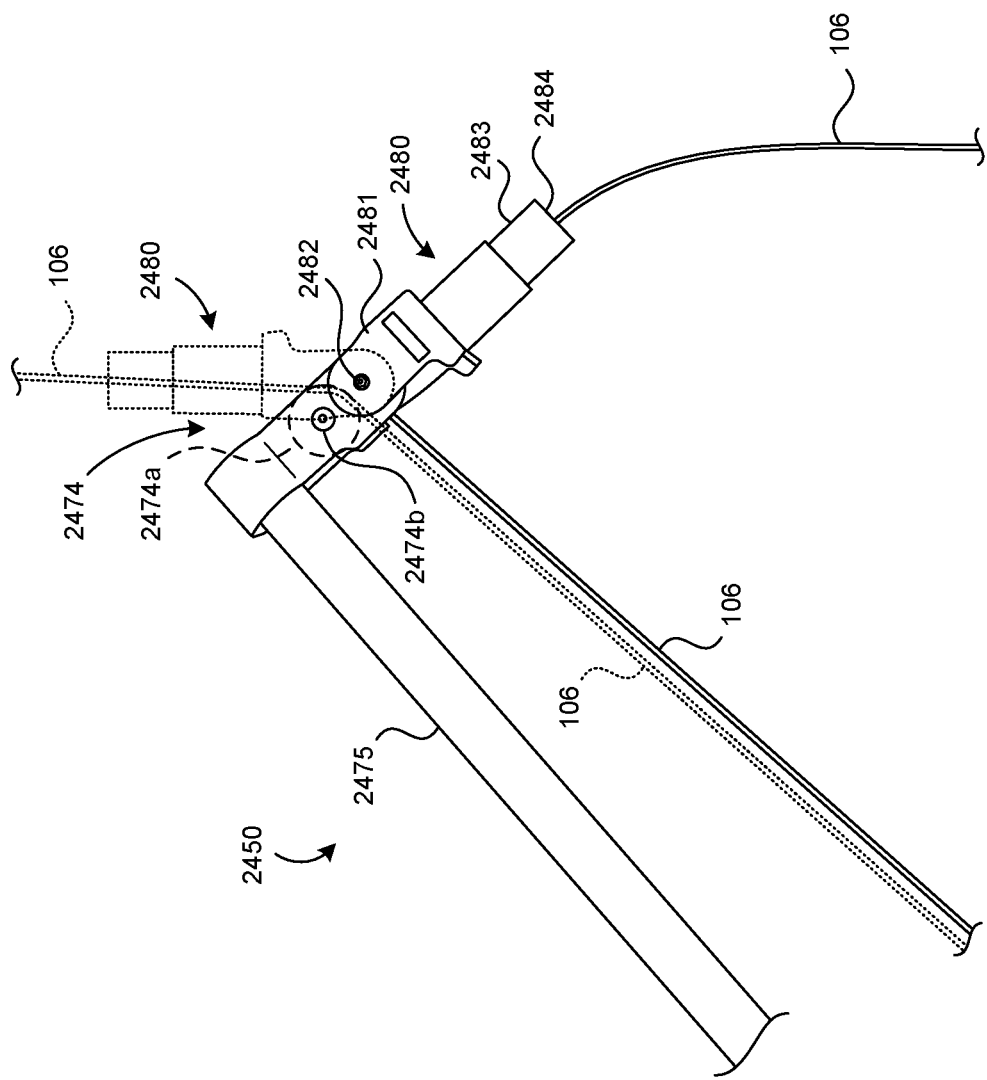
FIG. 24B is a partially schematic, enlarged illustration of a portion of a boom and a line support element configured in accordance with some embodiments of the present technology.

FIG. 24B is an enlarged illustration of the end portion of a representative boom 2475, configured in accordance with some embodiments of the present technology. The line support element 2474 can include a pulley 2474a carried on a pulley axle 2474b to rotate relative to the boom 2475. The arrangement can further include a motion control element 2480 that controls the post-capture motion of the second aircraft 120 (FIG. 24A). In some embodiments, the motion control element 2480 includes a bracket 2481 connected to the boom 2475 via a pivot pin 2482. A cylinder 2483 extends from the bracket 2481. The cylinder 2483 includes an aperture 2484 through which the capture line 106 is fed. When the capture line extends upwardly from the boom 2475 (as indicated in dashed lines) prior to capture, the motion control element 2480 also pivots upwardly, as is also indicated in dashed lines. When the second aircraft 120 contacts the capture line 106, the capture line 106 pays out rapidly, under the guidance of the pulley 2474a to reduce line friction. After the second aircraft 120 has been captured, the first aircraft 101 (FIG. 24A) begins to descend, the tension device 172 (FIG. 24A) reels in the slack capture line 106, and the motion control element 2480 gradually pivots downwardly. Prior to the first aircraft 101 setting down, the capture line 106 is reeled in sufficiently to engage the captured second aircraft 120 with the motion control element 2480. For example, the second capture devices 524 (FIG. 5A) of the captured second aircraft 120 can be snuggly received in the aperture 2484, which reduces or eliminates the tendency for the captured second aircraft 120 to spin and/or swing back and forth (e.g., into the boom 2475). Accordingly, the motion control element 2480 can further reduce the likelihood for the captured second aircraft 120 to contact the retrieval device 2450. When the first aircraft 101 descends below the line support element 2474 and lands, the capture line 106 arcs around the pivot pin 2482.

Figure 24C:
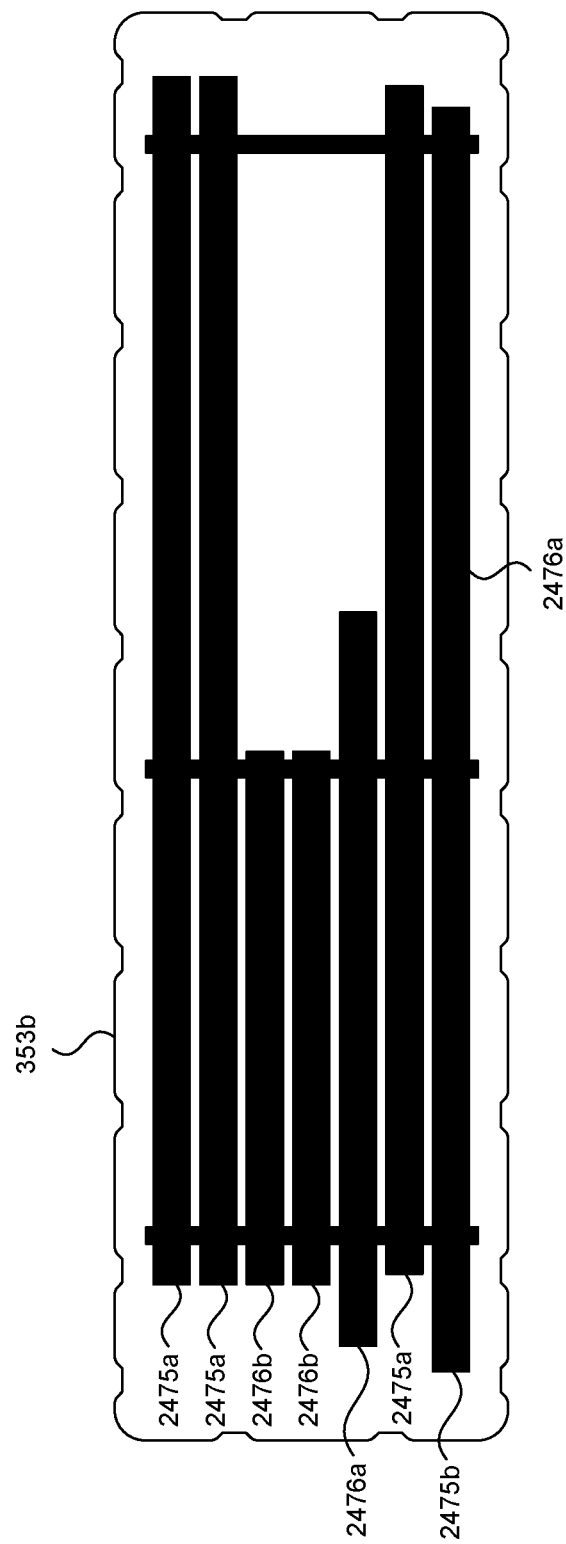
FIG. 24C is a partially schematic, plan view illustration of a container element configured to carry a boom and boom support elements, in accordance with some embodiments of the present technology.

FIG. 24C is a partially schematic, plan view illustration of the second shipping container element 353b (e.g., a container lid) configured in accordance with some embodiments of the present technology. For example, the second shipping container element 353b can removably carry multiple boom segments 2475a, which can be connected to each other to form the boom 2475 shown in FIG. 24A. The second shipping container element 353b can further house elements of the boom supports 2476, illustrated as first elements 2476a, and second elements 2476b. The foregoing elements can be easily removed from the second shipping container element 353b, assembled, and placed into a deployed configuration, as shown in FIG. 24A.

Figure 25A:
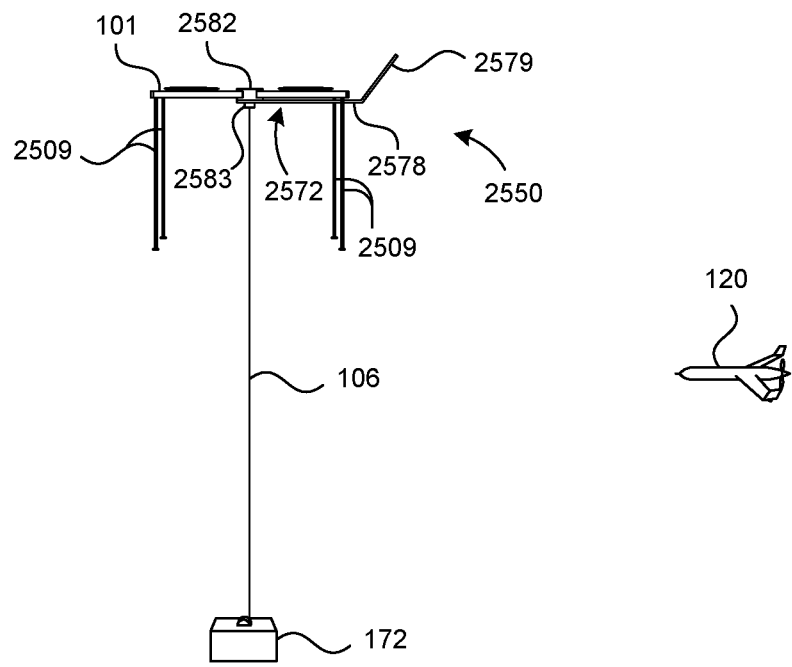
FIGS. 25A-25B are partially schematic, side elevation views of a system in which the retrieval device includes a track carried by an aircraft in accordance with some embodiments of the present technology.
Figure 25B:
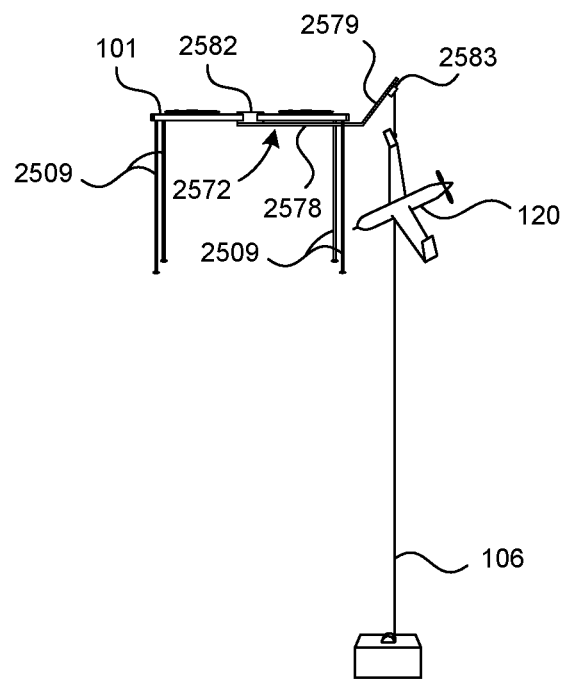

FIGS. 25A-25B illustrate a system that includes a retrieval device 2550 carried by the first aircraft 101. For example, the retrieval device 2550 can include an aircraft winch 2582 carried by the first aircraft 101. The retrieval device 2550 can further include a capture line guide 2583 movably carried by a track 2577 so as to move along the track 2577. Accordingly, the capture line guide 2583 operates as a movable fixture for carrying the capture line 106. The track 2577 can include a lateral portion 2578 and an upright or partially upright portion 2579. The first aircraft 101 can further include landing gear 2509 configured to support the second aircraft 120 while the second aircraft 120 is hanging from the capture line 106 by one wing. Accordingly, the landing gear 2509 can extend far enough away from the main body of the first aircraft 101 to allow the suspended second aircraft 120 to hang from the capture line 106 without touching the ground. In some embodiments, the landing gear 2509 can be extendable and retractable (e.g., telescopically) so as to have a shortened configuration during flight, and a lengthened configuration when bringing the second aircraft 120 to the ground.

In operation, the second aircraft 120 can engage the capture line 106 via a wing-mounted hook generally in the manner described above. Once the second aircraft 120 has been captured, the line guide 2583 is activated to move along the track 2577 (as shown in FIG. 25B), thus moving the second aircraft 120 laterally and upwardly. Because the track 2577 includes the upright portion 2579, the distance by which the captured second aircraft 120 projects beneath the first aircraft 101 is reduced, thus reducing the length of the landing gear 2509 necessary to touch the ground without causing the second aircraft 120 to do so.

Figure 26A:
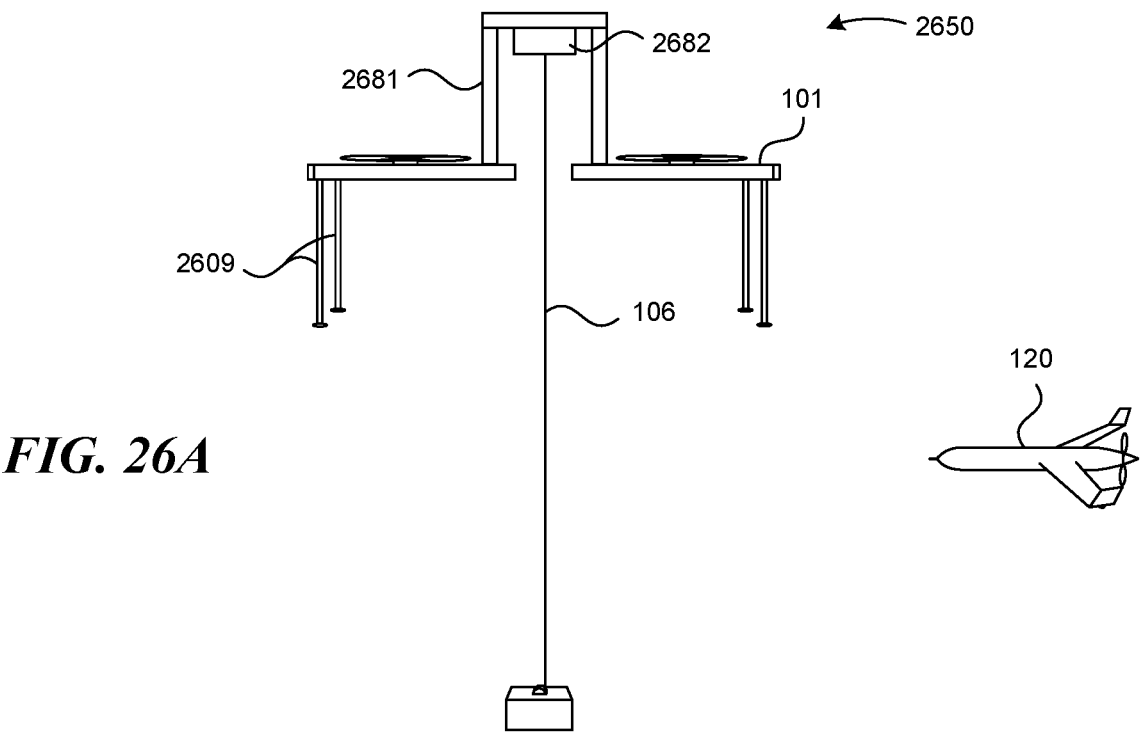
FIGS. 26A-26B are partially schematic, side view illustrations of an aircraft carrying a retrieval system in accordance with some embodiments of the present technology.
Figure 26B:
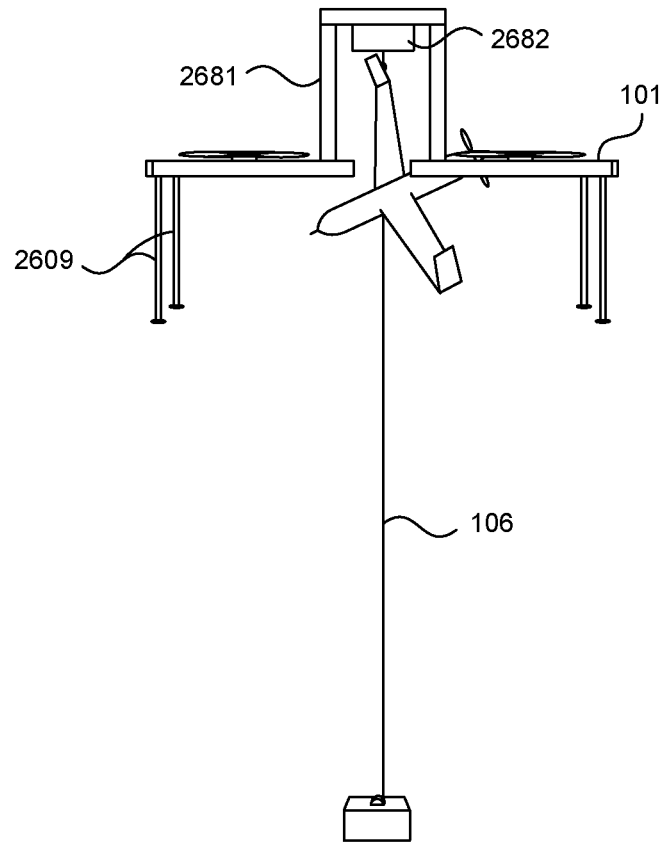

FIG. 26A illustrates some embodiments in which the first aircraft 101 includes a retrieval device 2650 having an aircraft winch 2682. For example, the aircraft winch 2682 is mounted to a centrally-positioned winch standoff 2681 positioned around a central opening in the first aircraft 101. Accordingly, the second aircraft 120 can be winched upwardly through the opening, rather than laterally as discussed above with reference to FIGS. 25A-25B. This operation is illustrated in FIG. 26B. An advantage of the configuration shown in FIGS. 26A-26B is that the length of the corresponding landing gear 2609 of the first aircraft 101 can be reduced (thus increasing the stability of the first aircraft 101 during landing). In addition, the fact that the second aircraft 120 remains suspended from the central portion of the first aircraft 101 during landing improves the balance and stability of the overall configuration, compared with a more lateral suspension location.

Figure 27B:
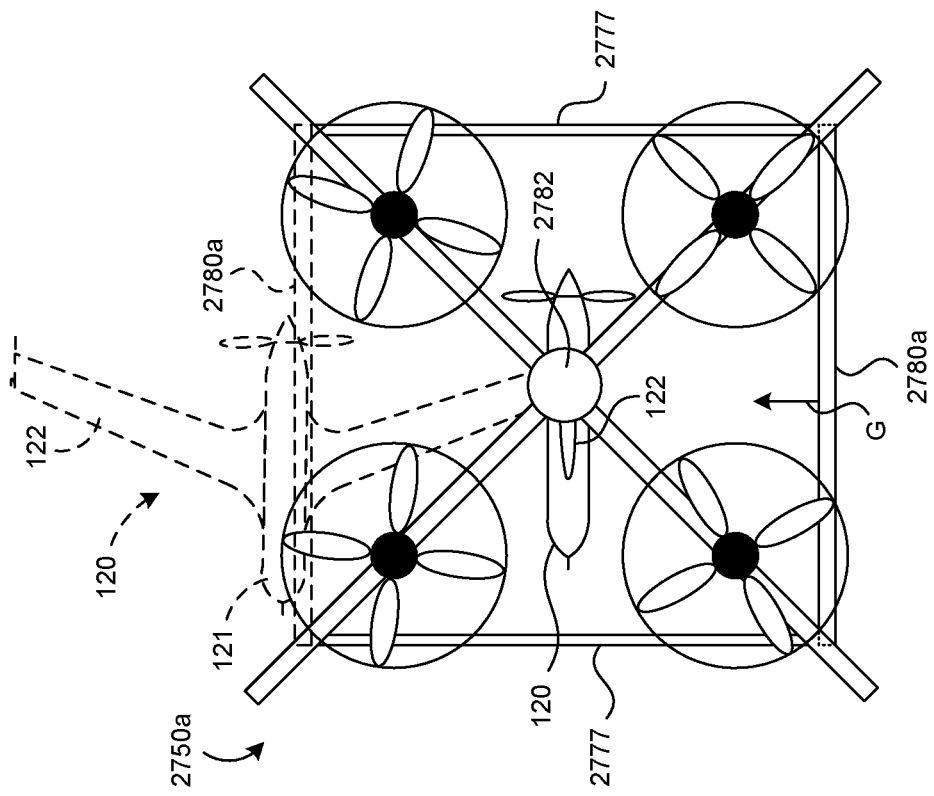
FIGS. 27A-27D illustrate aircraft having retrieval devices with sweeper arms configured in accordance with some embodiments of the present technology.
Figure 27A:
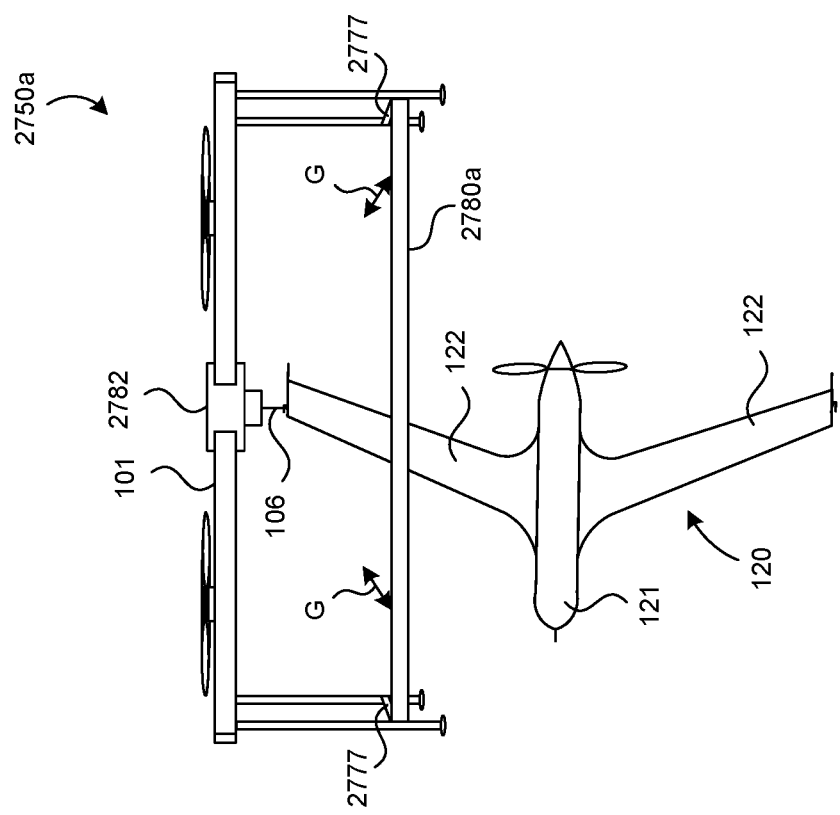

FIGS. 27A-27B illustrate a first aircraft 101 having a retrieval device 2750a that reorients the second aircraft 120 from an initial generally vertical position immediately after capture, to a generally horizontal (or more horizontal) position prior to landing and retrieval. For example, as shown in FIG. 27A, the retrieval device 2750a can include a sweeper 2780a mounted to two corresponding tracks 2777 so as to move inwardly and outwardly relative to the plane of FIG. 27A, as indicated by arrows G. During operation, the second aircraft 120 engages with the capture line 106, and is winched upwardly toward the first aircraft 101 via an aircraft winch 2782. With the second aircraft 120 in the position shown in FIG. 27A, the sweeper 2780a is actuated to gently engage with the second aircraft 120 and slide along the wing 122 and/or fuselage 121 of the second aircraft 120 to reorient it into a generally horizontal configuration. For example, as shown in FIG. 27B, the sweeper 2780a and the second aircraft 120b initially have the positions shown in solid lines, and, as the sweeper 2780a moves inwardly (as shown by arrow G), both the sweeper 2780a and the second aircraft 120 move to the positions shown by dotted lines.

Figure 27C:
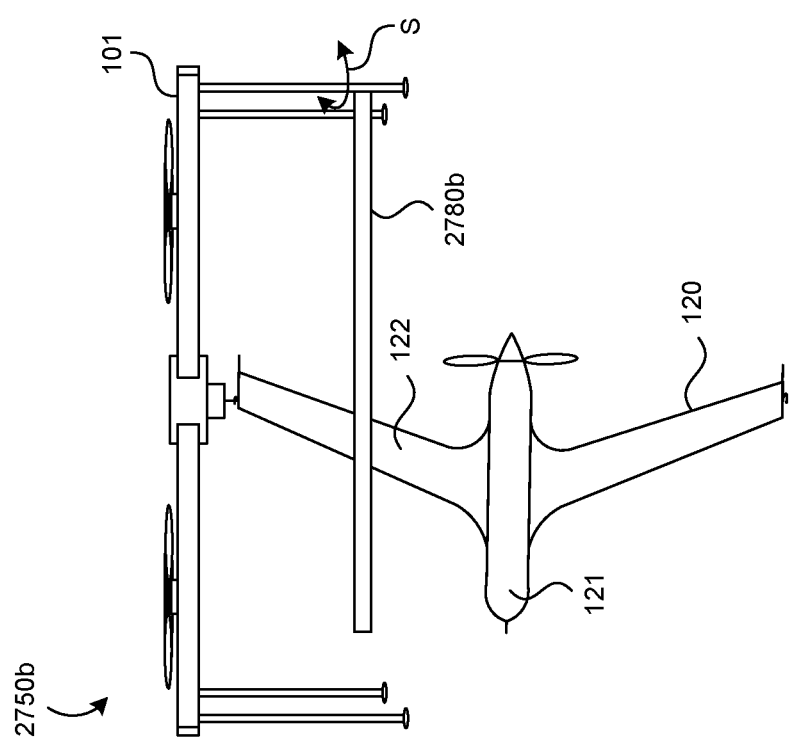
Figure 27D:
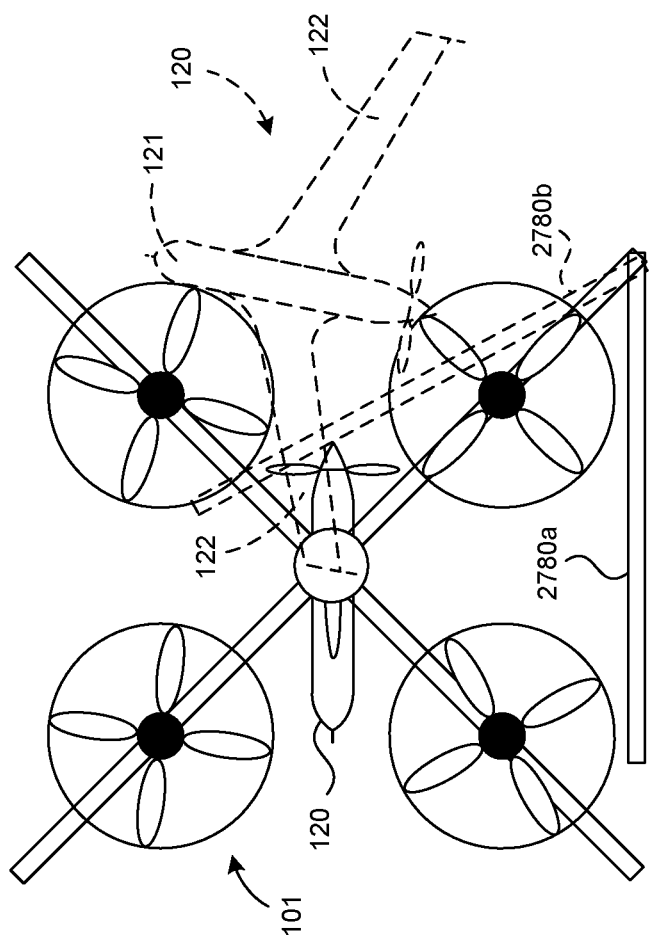

FIGS. 27C-27D illustrate the first aircraft 101 having a retrieval device 2750b that is similar to the retrieval device 2750a described above with reference to FIGS. 27A-27B, but that pivots rather than translates. In particular, the retrieval device 2750b can include a sweeper 2780b that pivots about a generally vertical axis, as indicated by arrow S. As shown in FIG. 27D, the pivoting motion of the sweeper 2780b from a first position (shown in solid lines) to a second position (shown in dotted lines) moved the second aircraft 120 from an initial, generally vertical position (shown in solid lines) to a second, generally horizontal position (shown in dotted lines).

One aspect of several of the embodiments described above with reference to FIGS. 1-27B is that the disclosed unmanned aerial vehicle systems can include a first, unmanned aircraft that launches, recovers, or both launches and recovers a second, unmanned aircraft. One advantage of this feature is that it allows the second aircraft to be deployed from and returned to sites with very limited access. Accordingly, such systems can operate in areas that are typically inaccessible to second unmanned aircraft having a fixed wing configuration. Because such aircraft typically have a longer endurance than multi-rotor unmanned aerial vehicles, the ability to deploy and recover such aircraft from more remote and inaccessible locations can significantly increase the overall range and endurance of the system.

Another feature of at least some of the foregoing embodiments is that the configurations of the first and second aircraft can differ significantly, in a manner that corresponds with the different missions carried out by the aircraft. For example, the first aircraft can be configured to have a relatively short endurance, and can be configured to take off and land vertically, thus allowing it to operate in confined spaces. The second aircraft, by contrast, can be configured to carry out long-range missions, and can further be configured to be launched and/or captured by the first aircraft.

Still another feature of some of the embodiments described above is a retrieval device positioned to support the carried aircraft for detachment from the capture line. An advantage of the retrieval device is that it can provide improved control over the captured aircraft, e.g., between the time the captured aircraft is captured, and the time the captured aircraft is released. The retrieval device can be configured to be carried, at least in part, onboard the first, carrier aircraft, or off-board the first, carrier aircraft.

From the foregoing, it will be appreciated that some embodiments of the present technology have been described herein for purposes of illustration, but various modifications may be made without deviating from the disclosed technology. For example, the first and second aircraft described above can have configurations other than those expressly shown in the figures. In general, the first aircraft can have a VTOL configuration, and the second aircraft can have a different (e.g., fixed wing) configuration. In another example, either or both the first and second aircraft can have other configurations.

As discussed above, the first aircraft can carry out a launch function only, a capture function only, or both a launch and capture function. In some embodiments, the same aircraft can carry out both launch and capture functions. For example, the first aircraft shown in FIGS. 14A-D can be configured for capture operations (as shown), or launch operations, or both. In another example, different aircraft (e.g., having the same or different configurations) can carry out the launch and capture functions. For example, in some embodiments, one aircraft launches the second aircraft and, while it is being recharged or otherwise prepared for another launch, a different aircraft performs the capture function.

The UAVs described above (e.g., the second aircraft 120) are generally small to medium in size. For example, a representative second aircraft has a takeoff gross weight of between 40 and 55 lbs. In another example, the second aircraft can have other suitable weights.

Several of the embodiments described above were described in the context of obstructed environments, for example, forested environments, crowded urban environments, and/or other such environments. In some embodiments, the same or similar systems can be used in environments that do not have such obstructions.

The first aircraft described above are illustrated as multirotor aircraft with four or eight rotors. In some embodiments, the first aircraft can have other rotor configurations (e.g., six rotors). In any of these embodiments, the power sources used to power the first aircraft can include batteries, internal combustion engines, turbines, fuel cells, and/or other suitable sources.

In a representative embodiment for which the first aircraft receives power from a ground-based source (for example, a power cable), the function provided by the power cable can be combined with the function provided by the capture line. For example, the same cable can both carry power to the first aircraft from the ground, and can be used to capture the second aircraft. In such embodiments, the cable is thick enough to carry the required electrical current to the first aircraft, thin enough to engage with the capture device carried by the second aircraft, and robust enough to withstand multiple impacts with the second capture device.

In general, the capture line is not carried aloft during a typical launch operation. In another example, the capture line can be lifted along with the second aircraft during a launch operation. Accordingly, if the second aircraft undergoes a malfunction shortly after launch, the recovery line can be used to retrieve the second aircraft. Such an arrangement may be suitable if the second aircraft can be launched from the first aircraft while the first aircraft hovers, rather than while the first aircraft is engaged in forward flight. In still further embodiments, the first aircraft can carry the recovery line entirely on board, without the recovery line being connected to the ground. The recovery line can accordingly be stowed on board the first aircraft and deployed only when needed for recovery.

When multiple aircraft are deployed to carry out and/or support a launch and/or capture operation (e.g., as discussed above with reference to FIGS. 5A-7), any of the aircraft can be programmed with instructions to operate in concert with each other, in a master/slave arrangement, as discussed above with reference to FIG. 5A, or in another suitable arrangement.

Certain aspects of the technology described in the context of some embodiments may be combined or eliminated in some embodiments. For example, the launch and recovery functions can be integrated into a single aircraft or divided among multiple aircraft. The sensors described in the context of an embodiment shown in FIGS. 4A-B can be included in other embodiments as well. Further, while advantages associated with some embodiments of the technology have been described in the context of those embodiments, some embodiments may also exhibit said advantages, and not all embodiments need necessarily exhibit such advantages to follow within the scope of the present technology. Accordingly, the present disclosure and associated technology can encompass other embodiments not expressly described or shown herein. The following examples provide additional embodiments of the disclosed technologies.

Some embodiments of the present technology are directed to an unmanned aerial vehicle (UAV) system, comprising a first, carrier aircraft having an airframe, a propulsion system carried by the airframe and positioned to support the carrier aircraft in hover, and a capture line. The capture line is carried by the carrier aircraft and is deployable to hang from the carrier aircraft. The capture line can be sized to releasably engage with a capture device of a second, carried (or captured) aircraft. The system can further include a retrieval device positioned to support the carried aircraft for detachment from the capture line.

In some embodiments, the retrieval device is detached from the carrier aircraft. For example, the retrieval device can include a boom and a line support element carried by the boom and positioned to engage with the capture line. The line support element can include a pulley or a hook. The system can further include at least one boom support attached to the boom and positioned to support the boom in an elevated position, and/or a tension device couplable to the capture line. In yet a further example, the system can include a first shipping container element configured to position the boom and the tension device in a deployed configuration, and a second shipping container element releasably connectable to the first shipping container element to position the at least one boom support in the deployed configuration, and resist relative motion between the boom and the at least one boom support. The first shipping container element can include a container body, and the second shipping container element can include a container lid. The system can further include a motion control assembly pivotally couplable to the boom and having an aperture positioned to receive the capture line and sized to engage with a portion of the carried aircraft. The motion control element can be pivotable between a first, upwardly facing position, and second, downwardly facing position.

In some embodiments, the retrieval device can include a net, a cushion, a base having a wing support member extending upwardly from it, an inflatable bladder, a mast and a plurality of uprights extending from the mast, and/or a clamp positioned to engage with the capture line.

In some embodiments, the retrieval device is carried by the carrier aircraft. For example, a representative retrieval device can include a sheet carried by the capture line, a support platform (e.g., a pad) carried by and movable along the capture line, a winch carried by the carrier aircraft, a sweeper movable from a first position to a second position to reorient the captured aircraft from a first, generally vertical orientation to a second, generally horizontal orientation, and/or other devices.

A representative method in accordance with some embodiments of the present technology includes launching a first, carrier aircraft having a capture line, and engaging a second, carried aircraft with the capture line. The method can further include supporting the carried aircraft for disengagement from the capture line, via a retrieval device, and disengaging the carried aircraft from the capture line. The method can still further include landing the carrier aircraft.

In further examples, supporting the carried aircraft can include engaging the capture line with a line support element carried by a boom positioned off-board the carrier aircraft. Disengaging the carried aircraft can include disengaging the carried aircraft while the capture line is engaged with the line support element. Engaging the capture line with the line support element can be performed before or after launching the carrier aircraft.

In a further example, the method can further comprise deploying a boom and at least one boom support from at least a first shipping container element, connecting the at least one boom support to the boom, supporting the boom with the first container element, supporting the boom support with a second container element, and connecting the first shipping container element to the second shipping container element to support the boom in an upright position.

To the extent any of the materials incorporated herein by reference conflict with the present disclosure, the present disclosure controls.

We claim:

1. An unmanned aerial vehicle (UAV) system, comprising:
 a first, carrier aircraft having:
  an airframe;
  a propulsion system carried by the airframe and positioned to support the carrier aircraft in hover; and
  a capture line carried by the carrier aircraft and deployable to hang from the carrier aircraft, the capture line being sized to releasably engage with a capture device of a second, carried aircraft; and
 a retrieval device detached from the carrier aircraft and positioned to support the carried aircraft for detachment from the capture line, the retrieval device including:
  a boom; and
  a line support element carried by the boom and positioned to engage with the capture line, the line support element including a pulley.

2. The system of claim 1, further comprising at least one boom support attached to the boom and positioned to support the boom in an elevated position.

3. The system of claim 1, further comprising a tension device couplable to the capture line.

4. The system of claim 1, further comprising:
 at least one boom support attached to the boom and positioned to support the boom in an elevated position;
 a tension device couplable to the capture line;
 a first container element configured to position the boom and the tension device in a deployed configuration;
 a second container element releasably connectable to the first container element to position the at least one boom support in the deployed configuration and resist relative motion between the boom and the at least one boom support.

5. The system of claim 4, wherein the first container element includes a container body, and wherein the second container element includes a container lid.

6. The system of claim 1, further comprising a motion control element pivotably couplable to the boom and having an aperture positioned to receive the capture line and sized to engage with a portion of the carried aircraft, the motion control element being pivotable between a first, upwardly facing position and a second, downwardly facing position.

7. The system of claim 1, wherein the propulsion system includes multiple rotors.

8. A method for capturing an unmanned aerial vehicle (UAV), the method comprising:
 launching a first, carrier aircraft having a capture line;
 engaging a second, carried aircraft with the capture line;
 supporting the carried aircraft for disengagement from the capture line by engaging the capture line with a line support element carried by a boom positioned off-board the carrier aircraft;
 disengaging the carried aircraft from the capture line; and
 landing the carrier aircraft.

9. The method of claim 8, further comprising:
 deploying the boom and at least one boom support from at least a first container element;
 connecting the at least one boom support to the boom;
 supporting the boom with the first container element;
 supporting the boom support with a second container element; and
 connecting the first container element to the second container element to support the boom in an upright position.

10. The method of claim 8, wherein disengaging the carried aircraft includes disengaging the carried aircraft while the capture line is engaged with the line support element.

11. The method of claim 10, further comprising engaging the capture line with the line support element before launching the carrier aircraft.

12. The method of claim 10, further comprising engaging the capture line with the line support element after launching the carrier aircraft.

13. The method of claim 8, further comprising placing the carrier aircraft in a hover mode before engaging the carried aircraft with the capture line.

14. The method of claim 8, wherein landing the carrier aircraft is performed before disengaging the carried aircraft from the capture line.

15. An unmanned aerial vehicle (UAV) system, comprising:
 a first, carrier aircraft having:
  an airframe;
  a propulsion system carried by the airframe and positioned to support the carrier aircraft in hover; and
  a capture line carried by the carrier aircraft and deployable to hang from the carrier aircraft, the capture line being sized to releasably engage with a capture device of a second, carried aircraft;
 a retrieval device detached from the carrier aircraft and positioned to support the carried aircraft for detachment from the capture line, the retrieval device including:
  a boom; and
  a line support element carried by the boom and positioned to engage with the capture line; and
 at least one boom support attached to the boom and positioned to support the boom in an elevated position.

16. The system of claim 15, wherein the line support element includes a pulley.

17. The system of claim 15, wherein the line support element includes a hook.

18. The system of claim 15, further comprising a tension device couplable to the capture line.

19. The system of claim 15, further comprising:
 a first container element configured to position the boom in a deployed configuration;
 a second container element releasably connectable to the first container element to position the at least one boom support in the deployed configuration and resist relative motion between the boom and the at least one boom support.

20. The system of claim 19, wherein the first container element includes a container body, and wherein the second container element includes a container lid.

21. The system of claim 15, further comprising a motion control element pivotably couplable to the boom and having an aperture positioned to receive the capture line and sized to engage with a portion of the carried aircraft, the motion control element being pivotable between a first, upwardly facing position and a second, downwardly facing position.

22. An unmanned aerial vehicle (UAV) system, comprising:
   a first, carrier aircraft having:
      an airframe;
      a propulsion system carried by the airframe and positioned to support the carrier aircraft in hover;
      a capture line carried by the carrier aircraft and deployable to hang from the carrier aircraft, the capture line being sized to releasably engage with a capture device of
   a second, carried aircraft; and
   a retrieval device detached from the carrier aircraft and positioned to support the carried aircraft for detachment from the capture line, the retrieval device including:
      a boom; and
      a line support element carried by the boom and positioned to engage with the capture line; and
   a motion control element pivotably couplable to the boom and having an aperture positioned to receive the capture line and sized to engage with a portion of the carried aircraft, the motion control element being pivotable between a first, upwardly facing position and a second, downwardly facing position.

23. The system of claim 22, wherein the line support element includes a pulley.

24. The system of claim 22, further comprising a tension device couplable to the capture line.

25. The system of claim 22, further comprising:
   a first container element configured to position the boom in a deployed configuration;
   a second container element releasably connectable to the first container element to position the at least one boom support in the deployed configuration and resist relative motion between the boom and the at least one boom support.

26. The system of claim 25, wherein the first container element includes a container body, and wherein the second container element includes a container lid.

27. An unmanned aerial vehicle (UAV) system, comprising:
   a first, carrier aircraft having:
      an airframe;
      a propulsion system carried by the airframe and positioned to support the carrier aircraft in hover; and
      a capture line carried by the carrier aircraft and deployable to hang from the carrier aircraft, the capture line being sized to releasably engage with a capture device of a second, carried aircraft; and
   a retrieval device detached from the carrier aircraft and positioned to support the carried aircraft for detachment from the capture line, the retrieval device including:
      a boom; and
      a line support element carried by the boom and engaged with the capture line.

28. The system of claim 27, wherein the line support element includes a pulley.

29. The system of claim 27, wherein the line support element includes a hook.

30. The system of claim 27, further comprising a tension device couplable to the capture line.

31. The system of claim 27, further comprising:
   a first container element configured to position the boom in a deployed configuration;
   a second container element releasably connectable to the first container element to position the at least one boom support in the deployed configuration and resist relative motion between the boom and the at least one boom support.

32. The system of claim 31, wherein the first container element includes a container body, and wherein the second container element includes a container lid.

33. The system of claim 27, further comprising a motion control element pivotably couplable to the boom and having an aperture positioned to receive the capture line and sized to engage with a portion of the carried aircraft, the motion control element being pivotable between a first, upwardly facing position and a second, downwardly facing position.

* * * * *

UNITED STATES PATENT AND TRADEMARK OFFICE
CERTIFICATE OF CORRECTION

Page 1 of 1

PATENT NO. : 10,836,509 B2
APPLICATION NO. : 15/839592
DATED : November 17, 2020
INVENTOR(S) : McGrew et al.

It is certified that error appears in the above-identified patent and that said Letters Patent is hereby corrected as shown below:

In the Claims

Column 23, Claim 22, Lines 19-20, correct the erroneous line break by replacing:
"device of
a second, carried aircraft; and"
With:
--device of a second, carried aircraft; and--.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*